US007475207B2

(12) United States Patent
Bromling et al.

(10) Patent No.: US 7,475,207 B2
(45) Date of Patent: Jan. 6, 2009

(54) MAINTAINING WRITE ORDER FIDELITY ON A MULTI-WRITER SYSTEM

(75) Inventors: Steve Bromling, Edmonton (CA); Dale Hagglund, Edmonton (CA); Geoff Hayward, Edmonton (CA); Roel Van der Goot, Edmonton (CA); Wayne Karpoff, Sherwood Park (CA)

(73) Assignee: EMC Corporation, Hopkinton, MA (US)

( * ) Notice: Subject to any disclaimer, the term of this patent is extended or adjusted under 35 U.S.C. 154(b) by 183 days.

(21) Appl. No.: 11/486,754

(22) Filed: Jul. 14, 2006

(65) Prior Publication Data

US 2007/0022264 A1  Jan. 25, 2007

Related U.S. Application Data

(60) Provisional application No. 60/699,935, filed on Jul. 14, 2005.

(51) Int. Cl.
*G06F 12/00* (2006.01)
(52) U.S. Cl. .................. 711/162; 711/148; 709/214
(58) Field of Classification Search .................. 711/162, 711/148; 709/213, 214, 217
See application file for complete search history.

(56) References Cited

U.S. PATENT DOCUMENTS

| 6,148,414 A | 11/2000 | Brown et al. |
| 6,427,213 B1 | 7/2002 | Dao |
| 6,823,336 B1 | 11/2004 | Srinivasan |
| 6,857,059 B2 | 2/2005 | Karpoff et al. |
| 6,912,668 B1 | 6/2005 | Brown et al. |
| 2004/0073831 A1 | 4/2004 | Yanai et al. |
| 2004/0117580 A1 | 6/2004 | Wu et al. |
| 2007/0022264 A1* | 1/2007 | Bromling et al. ............ 711/162 |

FOREIGN PATENT DOCUMENTS

CA  2486994  11/2003

OTHER PUBLICATIONS

Minwen, Ji., et al., "Seneca: remote mirroring done write", *Proceedings of USENIX Technical Conference*, Jun. 2003, pp. 253-268, Berkeley, CA.

* cited by examiner

*Primary Examiner*—Brian R Peugh
(74) *Attorney, Agent, or Firm*—BainwoodHuang

(57) ABSTRACT

Write order fidelity (WOF) is maintained for totally-active implementations wherein a plurality of access nodes at geographically separated sites can concurrently read and/or write data in a "totally active" fashion on a distributed data system. From the hosts' perspective at diverse geographic locations, a synchronous, cache-coherent view of data is provided. Data transfer is asynchronous. A time ordered data image is created and maintained so operations can be restarted after a partial system failure that causes loss of data not yet asynchronously transferred across the network, but that has been write-acknowledged to the originating host. Time ordered asynchronous data transfer is implemented as a pipeline of changes that reflect contributions from all nodes. WOF also improves network performance and lowers bandwidth consumption. Extensions can provide, in a totally-active context, features such as point-in-time snapshots, time firewalls, on-demand backend storage allocation, synchronous/asynchronous distribution of data, and continuous data protection.

35 Claims, 7 Drawing Sheets

Nesting Group
(1102)

MAINTAINING WRITE ORDER FIDELITY ON A MULTI-WRITER SYSTEM

CROSS-REFERENCES TO RELATED APPLICATIONS

The present application is a Non-provisional application and claims priority to U.S. Provisional Application No. 60/699,935, filed on Jul. 14, 2005, the entire contents of which are herein incorporated by reference for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

BACKGROUND OF THE INVENTION

The present invention relates generally to systems and methods for providing recovery of the contents of a data storage system after a failure or other potential source of data loss or corruption, and more specifically to systems and methods for providing write order fidelity for a storage system having data writers operating concurrently in multiple locations across a distributed data storage network.

In current storage networks, and in particular storage networks including geographically separated access nodes and storage resources interconnected by a network, write performance can be severely hampered as distance between nodes increases if writes must be replicated or transmitted synchronously. Additionally, minimizing required bandwidth between locations is highly desirable. Thus, methods of asynchronously transmitting data are used where the write is acknowledged before the data is transferred to nodes at remote sites.

It is also desirable that data access be localized, in part to improve access speed to blocks of data requested by host devices. Caching blocks at access nodes provides localization, however, the cached data must be kept coherent with respect to modifications at other access nodes that may be caching the same data.

Further, such complex storage applications need to withstand the failure of their backing storage systems, of local storage networks, of the network interconnecting nodes, and of the access nodes. Should a failure occur, asynchronous data transmission implies the potential for the loss of data held at the failed site. A consistent data image, from the perspective of the application, needs to be constructed from the surviving storage contents. An application must make some assumptions about which writes, or pieces of data to be written, to the storage system have survived the storage system failure; specifically, that for all writes acknowledged by the storage system as having been completed, that the ordering of writes is maintained such that if a modification due to a write to a given block is lost, then all subsequent writes to blocks in the volume or related volumes of blocks is also lost.

The term write order fidelity ("WOF") as used herein refers to a group of related properties, each of which describes the contents of a storage system after recovery from some type of failure. That is, after the storage system recovers from a failure, properties that the application can assume about the contents of the storage system. Write Order Fidelity (WOF) introduces a guarantee that, after recovery from a failure, surviving data will be consistent. Complex applications such as file systems or databases rely on this consistency property to recover after a failure of the storage system. Even simpler applications that are not explicitly written to recover from their own failure or the failure of backend storage should benefit from these post-failure guarantees.

When implementing WOF in a strict sense, an application will generate a stream of writes $\{W_i | i \geq 1\}$ to the storage system supporting that application. The underlying storage system exhibits strict write order fidelity if, after any failure of the storage system, the state of the storage system upon recovery reflects some prefix of the write sequence from the application. In other words, there exists some $i \geq 0$ such that all of writes $\{W_j | j \leq i\}$ have been committed to storage, and none of writes $\{W_j | j > i\}$ have been committed to storage.

Strict WOF assumes that writes can be totally ordered, which is straightforward for a single controller or for a set of tightly-coupled storage controllers communicating through shared memory. The costs of generating such a total order on writes, however, become significant for controllers communicating via messages passing even within a site. The ordering costs become unacceptable as inter-controller latencies reach even a few milliseconds.

Traditionally, an "active-passive" approach is used for asynchronous transmission of data between sites such that only one writer, or host processor, has read-write access to a given volume of blocks, and other processors only have read access. An environment which is "totally-active", where read and writes to a given volume of blocks can occur randomly from any node is highly desirable, but requires changes in the approach to WOF and how WOF interacts with caching at all access nodes in the system.

BRIEF SUMMARY OF THE INVENTION

Embodiments in accordance with the present invention provide write order fidelity (WOF) in distributed storage systems where storage access nodes, commonly referred to as storage controllers, and storage systems are interconnected with a network. Clearly, any network allowing communication between nodes can be used. While various embodiments allow for totally-active operation, where writes and/or reads to any given data volume may be initiated from any node in the system, clearly the same systems can also be used in a traditional active-passive mode.

WOF is obtained in some aspects by utilizing delta sets distributed or fragmented across various sites and/or nodes utilizing a cache coherency layer. Various embodiments can provide WOF to totally-active sites without unacceptable performance cost by using distributed cache coherency to ensure the most recent write to any given node is immediately reflected in subsequent reads by any site and thus provides a coherent application view. This also can insure that data blocks written to any given delta set distributed across distributed nodes are coherent, reflecting the most recent write, with corresponding partial deltas housed at the various nodes in the system.

In one embodiment, one or more host-visible volumes of data are managed as WOF groups. Even though multiple data volumes compose a WOF group, WOF is ensured for all blocks from all data volumes within the WOF groups as if all blocks were within a single volume.

In one embodiment, a multi stage pipeline of delta sets is used to collect newly written block images, to exchange block images between nodes and to commit block images to backend storage. A system-wide barrier mechanism insures that the pipeline of delta sets advances simultaneously on all nodes in the system. Clearly, the barrier does not have to be system-wide if not all nodes are participating in the management of a given WOF group. New writes to any of the multiple data volumes making up a WOF group are stored in cache for an "open delta" for that WOF group. Upon some triggering or other event, the current open delta should be closed. A message to close the open delta is broadcast to that WOF group so that any outstanding writes can be completed and the delta can be closed. A new delta is opened to receive new writes. The recently closed delta, which can exist as unique fragments on different WOF groups, undergoes an "exchange phase" so that each site obtains a complete copy of the closed delta. After all modified blocks have been exchanged between nodes and the next barrier occurs demarking the next advancement of the pipeline, the complete closed deltas enter the "commit phase" and can be made persistent by writing to stable storage.

These and other embodiments of the present invention, as well as its advantages and features, are described in more detail in conjunction with the text below and attached figures.

BRIEF DESCRIPTION OF THE DRAWINGS

Various embodiments in accordance with the present invention will be described with reference to the drawings, in which.

DETAILED DESCRIPTION OF THE INVENTION

Figure 1:
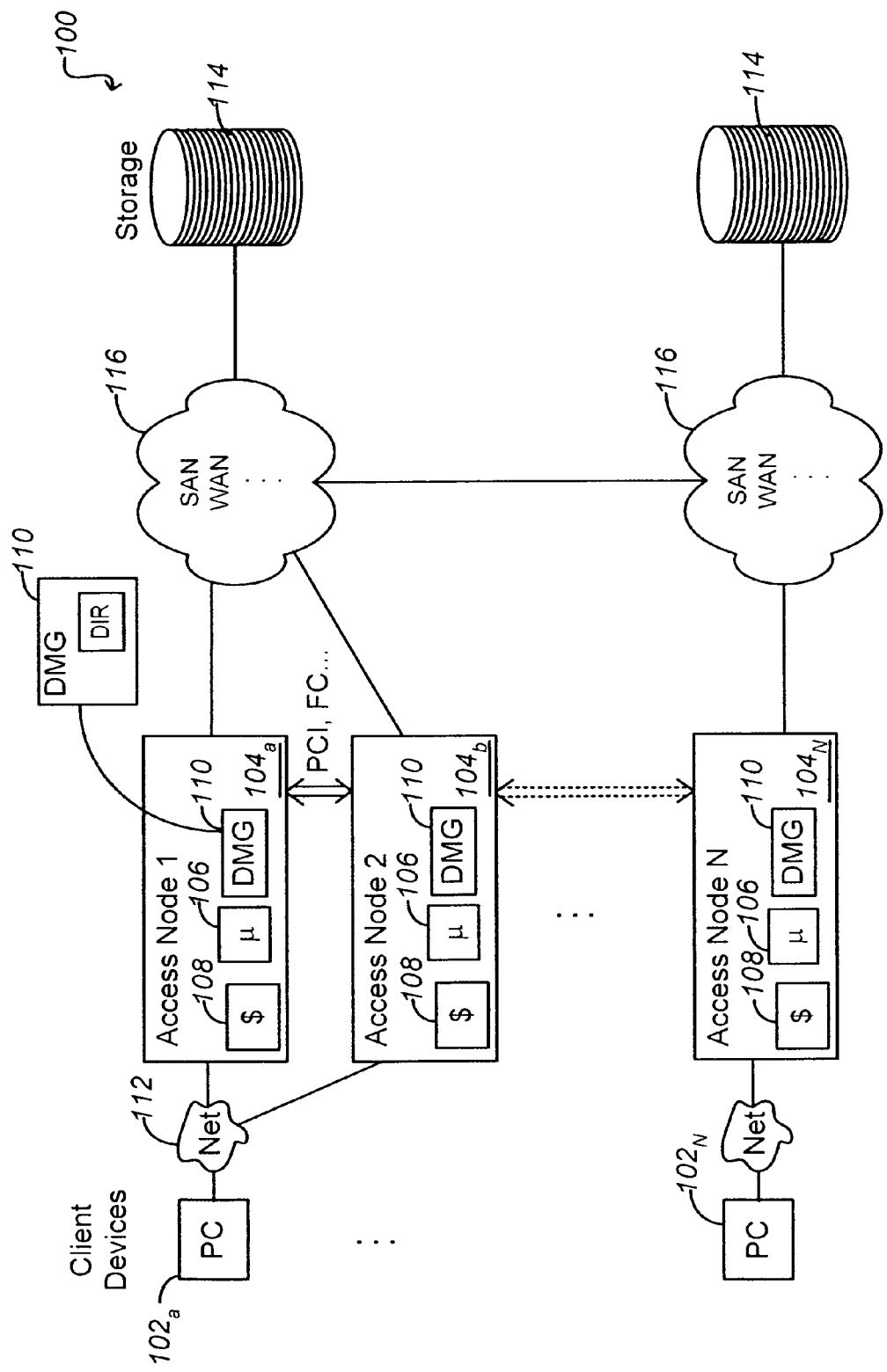
FIG. 1 illustrates a distributed storage system that can be used in accordance with one embodiment of the present invention.

Systems and methods in accordance with various embodiments overcome the aforementioned and other deficiencies in existing data storage systems by providing various totally-active implementations, wherein multiple sites each can read and/or write data concurrently while maintaining write order fidelity (WOF), as opposed to existing active/passive implementations wherein a single writer typically pushes data across a network to a passive site. These and other objects can be achieved in one aspect by combining an improved delta set approach to write order fidelity with approaches for providing distributed cache coherence.

In one aspect, a time ordered image of data is created and maintained so that operations can be restarted after a storage system failure without having corrupt file systems, data bases, or other application inconsistent views of data. Existing systems typically send data in blocks, as known in the art to be a basic unit of data transfer, and must preserve the order of those blocks. This creates a significant number of short transactions, which can cause a slow down in network and/or system performance as the latency increases. One way to reduce the number of transactions is to group blocks into deltas, or delta sets. Using delta sets can increase the granularity of data transfers across a network thus increasing the efficiency network transfer, and eliminating multiple transfers of an individual block written to multiple times within the time interval captured by a delta set, so that if an individual block is written many times that block will only be written once using a delta. The boundaries between deltas provide write-order consistent images of data.

Delta sets are described, for example, in U.S. Pat. No. 6,823,336, issued Nov. 23, 2004, which is hereby incorporated herein by reference. Other descriptions of deltas and methods for remote data mirroring are described, for example, in U.S. Pat. No. 7,055,059, issued May 30, 2006, and "Seneca: remote mirroring done write," by Minwen Ji et al, proceedings of USENIX Technical Conference, pages 253-256, June 2003, each of which is hereby incorporated herein by reference.

Prior to this invention, delta set based WOF implementations supported only active-passive data access. In this scenario, implementing WOF is substantially simpler because the 'active' site can completely control the transition between WOF images. A simple active-passive implementation of WOF involves maintaining only two delta sets with a memory region allocated for each of the two partial deltas at the active and passive sites. After a decision was made at the active node to advance the delta image, new writes are simply accepted into the alternate buffer. A message is sent to the passive site indicating the switch and transferring the data from the newly closed delta. Once the 'push' of data to the passive site is complete, both sites can commit the now exchanged data to disk. Having completed this, the active site can again toggle between delta set buffers closing the current deltas. Extensions to the traditional delta set based WOF implementation include maintaining more delta sets, typically maintained as a rotating set of buffers, allowing the exchange of closed buffers to lag behind due to short-term network bandwidth saturation. Further details of basic use of delta sets are described in U.S. Pat. No. 6,823,336, incorporated by reference above, and will not be discussed in further detail herein.

Introducing the possibility of multiple nodes at, potentially, multiple sites writing to common data volumes requires a more sophisticated approach. In one embodiment, distributed cache coherence mechanisms, such as those taught in U.S. patent application Ser. No. 11/177,924, filed Jul. 7, 2005, entitled "Systems and Methods for Providing Distributed Cache Coherence," and Provisional Application No. 60/586,364, filed Jul. 7, 2004, all incorporated herein by reference. These methods provide a mechanism where by cache maintained in a plurality of nodes both local and network separated, with the potential for read/write access from all nodes, is kept coherent, that is, provides the ordering of dispensing data images as a system where all hosts are accessing a single disk drive. Utilizing distributed cache coherency with delta sets allows for a synchronous image of the data even though actual data motion is asynchronous. The data motion maintains write order fidelity across geography, so the system can be restarted at any consistent point in time.

In one aspect, a Directory Manager module ("DMG") can be used to provide cache coherence mechanisms for shared data across a distributed set of data access nodes. A set of nodes used to cache data from a shared data volume is referred to as a share group. In general, a DMG module includes software executing on a processor or other intelligence module (e.g., ASIC) in a node. A DMG module can be implemented in a single node or distributed across multiple intercommunicating nodes. In certain aspects, an access node is embodied as a controller device, or node, communicably coupled to a storage network, such as a storage area network (SAN), that allows access to data stored on the storage network. However, it will be appreciated that an access node can also be embodied as an intelligent fabric switch or other network device such as a hub adapter. Further, any networked node can be configured to operate as an access node with DMG functionality (e.g., a DMG can be run on a desktop computer with a network connection). U.S. Pat. No. 6,148,414, which is hereby incorporated herein by reference, discloses controller devices and nodes for which implementation of aspects of the present invention are particularly useful.

For one embodiment of the invention, FIG. 1 shows a basic network configuration 100 including a plurality of network clients 102(a)-102(N) that are communicably coupled with a plurality of access node devices 104(a)-104(N). Each access node device includes a processor component 106 such as a microprocessor or other intelligence module, a cache 108 (e.g., RAM cache) and/or other local storage, communication ports (not shown), and an instance of a DMG module 110. In general, "N" is used herein to indicate an indefinite plurality, so that the number "N" when referring to one component does not necessarily equal the number "N" of a different component. Each client 102 can be communicably coupled to one or more of the access nodes 104 over a local network connection 112, for speed and other reasons, or can be communicably coupled with nodes 104 over any of a number of connection schemes as required for the specific application and geographical location, including, for example, a direct wired or wireless connection, an Internet connection, any local area network (LAN) type connection, any metropolitan area network (MAN) connection, any wide area network (WAN) type connection, a VLAN, any proprietary network connection, etc. Each node 104 also typically includes, or is communicably coupled with, one or more other nodes, and is communicably coupled with one or multiple storage resources 114, each including one or more disk drives, over one or more networks 116, such as a storage area network (SAN), LAN, WAN, MAN, high speed networks such as Infiniband, etc. In one aspect it is preferable that a node 104 be coupled to one or more storage resources 114 over a local network connection. The nodes may be located in close physical proximity to each other, or at least one may be remotely located, e.g., geographically remote, from other nodes. Access nodes are also able to intercommunicate with other nodes over the network 116 and/or over other communication networks or mediums such as over a PCI bus or backbone or a Fibre channel network, or over the same network 112 the client devices 102 use to communicate with the access nodes 104.

Distributed cache coherence helps to reduce bandwidth requirements between geographically separated access nodes by allowing localized (cached) access to remote data. Data access generally cannot be localized unless the data can be locally cached, yet it is unsafe to locally cache the data unless the cached data can be kept coherent with respect to modifications at remote access nodes. Embodiments of the DMG can satisfy the correctness requirements of cache coherence, and can have low enough overhead to make localized cache access practical and beneficial. While the embodiment described in FIG. 1 shows a single DMG Directory 110, the methods for distributed cache coherence taught in the above patents manage coherency on a peer-to-peer basis and are scalable to both many nodes and to great distances between nodes. The distributed cache coherence can be combined with the use of delta sets to provide for write order fidelity (WOF).

For one embodiment, write order fidelity (WOF) and "dependent WOF" can be more formally defined as follows. An application can utilize an update operation to update its persistent state, where the update operation consists of two update write operations: a metadata update $W_1$ (e.g., writing an entry to a database recovery log) and a data update $W_2$ (e.g., writing modified data to the database). For proper failure recovery, either of the application itself or of the storage, the application will wait until the metadata update $W_1$ has completed before issuing the data update $W_2$. The timing relationship between these two writes will be denoted herein as $W_1 \rightarrow W_2$, where $W_2$ is said to be "dependent" on $W_1$, and $W_1$ is said to be "necessary" for $W_2$. Using such an approach allows $W_1$ to record information without which $W_2$ cannot be correctly interpreted. In such a storage system, dependent writes can be observed by noting that the start time of $W_2$ is after the completion time of $W_1$.

Such a storage system can be said to exhibit "dependent" write order fidelity if, after recovering from any failure, for any two writes $W_1 \rightarrow W_2$ exactly one of the following cases holds: (a) neither $W_1$ nor $W_2$ has been applied to storage, (b) both $W_1$ and $W_2$ have been applied to storage, or (c) only $W_1$ has been applied to storage.

Dependent WOF defines a partial, rather than a total, order on write operations. In some embodiments this can utilize a globally synchronized notion of time, while other embodiments avoid this issue. Further, writes which are not ordered by dependent WOF are exactly those writes which are executed concurrently by the application. According to one aspect, dependent write order fidelity is an appropriate definition of consistency for a network controller such as the NetStorager product. U.S. Pat. No. 6,148,414, which is hereby incorporated by reference, discloses aspects of useful network controllers.

In one aspect, the storage system determines that a pair of writes $W_1$ and $W_2$ are dependent from the point of view of the application. This is not straightforward for the storage device to determine these dependencies, as the storage device can only observe that $W_2$ arrives after $W_1$ has been completed. It may be the case that there is no dependent relationship between these two writes, and the apparent ordering is just a coincidence. Without help from the application, which is not assumed, the storage system typically cannot distinguish between coincidental and genuine dependent write pairs. To be safe, the storage system can assume that any case in which $W_2$ arrives after $W_1$ completes indicates a true dependent write. This creates a stronger partial order than necessary, but the true write dependencies will be a subset of this stronger ordering.

In one aspect, an environment with multiple active, cache-coherent initiators utilizes a global notion of time in order to provide dependent WOF. A naive interpretation of such a use implies an absolute global ordering of writes. The per-write overhead of the naive approach is too expensive to merit serious consideration, especially for geographically separated situations. One alternative involves grouping batches of writes into deltas so that the boundaries between the deltas obey dependent write-order fidelity as defined above.

Within a delta used to represent system changes as discussed above, writes can be reordered providing for some level of optimization. When a delta is closed, all the writes contained in the delta are dependent upon writes in the same delta or in a previous delta. If a necessary write were deferred until a later delta, WOF would no longer be preserved across the delta boundary. The delta close operation therefore should be coordinated across all participating nodes.

A delta is global across all nodes at all sites participating in a WOF group in one embodiment. Each node collects a fragment of the delta written locally. Each site requires a complete copy to commit to local storage, so the sites exchange the fragments to assemble a complete copy. In one aspect, these partial deltas are exchanged between sites before being applied locally. After the exchange, each site can locally commit the delta to the underlying storage. The local commit is done atomically and in the correct order with respect to other deltas. The need for atomicity means that deltas are made persistent before they are applied. Varying the degree of persistence can affect the strength of the WOF consistency guarantee. For example, placing the deltas in stable storage is safer than copying the deltas to the volatile memory on a redundant device.

With a WOF solution, underlying storage can be seen as moving atomically through a sequence of consistent states. If each site gathers an entire global delta before applying the delta locally to storage, an inter-site link failure cannot leave storage in an inconsistent state. The delta is either applied in its entirety or not at all.

In one aspect, a network administrator groups front-end volumes that need to be inter-consistent into WOF groups. For example, all data and log volumes of a database can be placed into the same WOF group. Each WOF group in one embodiment is managed by some subset of nodes and sites in the overall system. New writes to a WOF group are collected in the cache for the current open delta, $\Delta_i$, and the back end of the cache generates the deltas.

With a WOF solution, underlying storage can be seen as moving atomically through a sequence of consistent states. If each site gathers an entire global delta before applying the delta locally to storage, an inter-site link failure cannot leave storage in an inconsistent state. The delta is either applied in its entirety or not at all. Thus, because of the implied time ordering imposed by a complete delta, atomic writes of deltas to underlying storage, whether or not completed, can preserve the properties of WOF.

In one aspect, new writes to a WOF group are collected in the cache for the current WOF delta, $\Delta_i$, and the backend of the cache generates the deltas. A delta collecting new writes is said to be "open". In one aspect, the decision to close the open delta, that is to stop accepting new writes and to advance the delta pipeline, is made periodically based on some time or space constraint. The decision to close a delta can also be made by an external trigger or as part of recovery from an system error condition. Closing deltas, opening new deltas, and, generally, advancing the delta pipeline is referred to as a "delta roll-over." In one aspect, a node that makes the decision to close a delta can transmit or broadcast a notification to the WOF group. As each node receives the notification, that node begins to delay acknowledgements to new write operations. This ensures that all write order dependencies go from $\Delta_i$ to $\Delta_{i+1}$, or are contained within $\Delta_i$. Once all the writes that were outstanding at the time the notification was received are completed, $\Delta_i$ is closed. $\Delta_{i+1}$ is now open and begins collecting new writes while $\Delta_i$ moves on to the exchange phase. To ensure that the application does not perceive a disruption in I/O, it is important to minimize the time for which writes to the wof group are delayed. If a general ordered broadcast service imposes too high an overhead for these broadcasts, a lighter-weight two-phase commit protocol can be used that minimizes the nodes involved in the commit protocol.

A delta pipeline role-over operation implies a periodic performance impact. Since the WOF consistency guarantees may only be needed in severe failure scenarios, an alternate implementation may choose to recover delta boundaries during error recovery and thereby remove the need for global barriers during normal operation.

A recently closed delta will exist as fragments in the caches on the access nodes in the WOF group. In one aspect, a cache coherency protocol guarantees that each fragment contains unique, non-overlapping "dirty" data. Each site assembles a complete copy of the delta by exchanging blocks contained in these fragments, or partial deltas. In one aspect, the atomic commit phase can be simplified if the copy of $\Delta_i$ for a site is on a single node. However, this can impose strict constraints on the global size of a delta, making the exchange phase and the decision to close a delta more complicated. In another aspect, the writes within the collected delta can be reordered to take advantage of over-writes or adjacent write segments.

Before $\Delta_i$ can be committed, in one aspect, the delta is made persistent. The persistence operation can be overlapped with the exchange phase. For a strong consistency guarantee, the data and associated metadata describing the delta can be written to stable storage. A less strong guarantee can be provided by copying the data one or more times to other node(s) at the same site thus providing "protection copies". Such a protection approach can be faster, but can impose further memory constraints. An even weaker guarantee would require no persistence. Without persistence, there is no protection against multiple failures, but data consistency can still be maintained in the case of a site disaster.

After $\Delta_i$ has been exchanged and made persistent, the sites in one aspect coordinate and begin to apply $\Delta_i$ to backend storage. This cannot be done in a truly atomic manner, and may be interrupted by a failure. The persistent copies protect from these failures, as long as some node can redo the commit. Once the commit of the delta has started, an interruption to the inter-site link has no effect, as the operation is purely local to the site.

The introduction of WOF in one aspect only affects the order in which dirty data moves out the backend of the cache, and has no effect on the cache coherency protocol. Read requests to any node will always return the most recent copy of the data. Cache write hits in a closed delta cannot invalidate the previous copy, but instead create a new copy in the open delta. This new copy shadows any previous version of the block, including the persistent copy stored on underlying storage, for cache coherency purposes.

Exemplary Dependent WOF Implementation

In one aspect, an exemplary WOF implementation has dependent-write ordering and is totally-active across and within a number of sites. Such an implementation supports full totally-active WOF, both across sites and across nodes within a site. The implementation also can be delta-based, where each delta contains a batch of consistent writes. The system is collecting a delta as an application writes to the network controller nodes. At intervals on the order of about 5-30 s, for example, the system synchronizes the closing of the current delta both locally and globally. A new delta is immediately opened to begin collecting new writes. The closed delta is then atomically written to the backend storage. The most recently committed delta defines the restoration point in case of failure.

Such an implementation also can provide support for WOF consistency groups. Databases, journaled file systems, and other similar applications often separate their data volumes from their metadata and log volumes. The administrator must be able to group these volumes so that WOF is provided across them as a set, not just individually.

Figure 2:
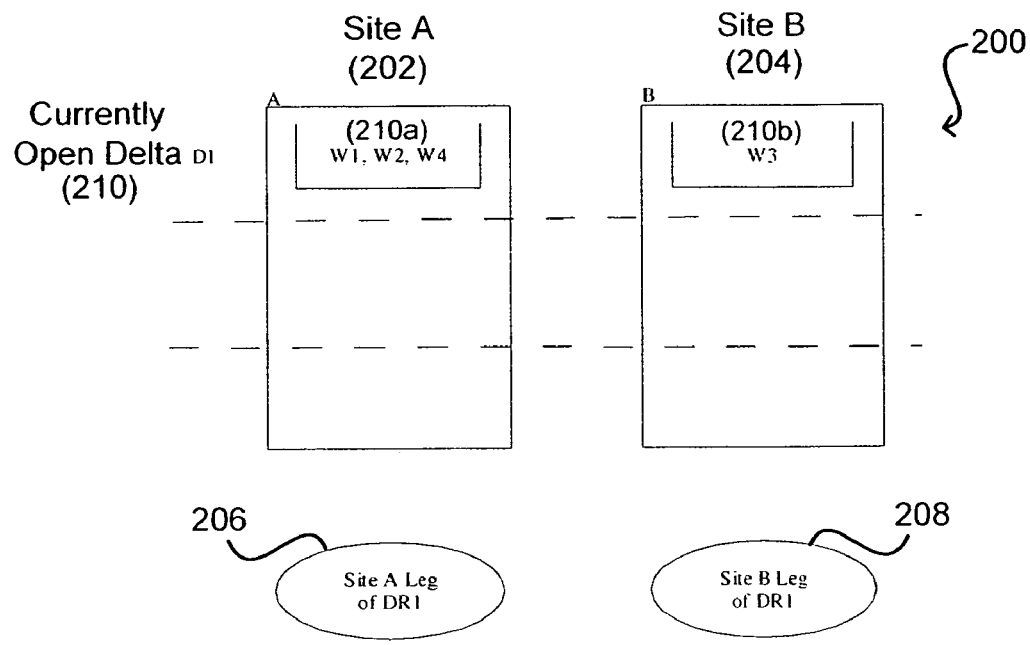
FIG. 2 illustrates a process step for use with multi-site storage system in accordance with one embodiment of the present invention.

This section gives a more concrete example of the WOF implementation. FIG. 2 shows an exemplary two site system 200, including site A 202 and site B 204, with one leg 206 of a distributed RAID 1 (DR1) at site A and one leg 208 at site B. Initially, each site collects writes into the currently open delta D1 210, shown schematically by the open box (210a, 210b) at the top of each site. The writes (W1, W2, W3, W4) are collected locally at each node at a site, subject to the usual cache coherency protocols. U.S. patent application Ser. No. 11/177,924, incorporated by reference above, discloses useful cache coherency systems and methods.

Eventually the system can decide to close the current delta for any of several different reasons. For example, a user-configurable timer may have expired. The administrator could use such a configurable timer to bound the amount of data that will be lost in the event of a failure. Another potential reason is that an external API is invoked by an application. The application can use this invoke to indicate times at which the data is fully consistent from its point of view. Still another potential reason is that the system is running out of resources on one or more nodes. One of the nodes collecting the delta may decide that the node needs to close the delta early.

Figure 3:
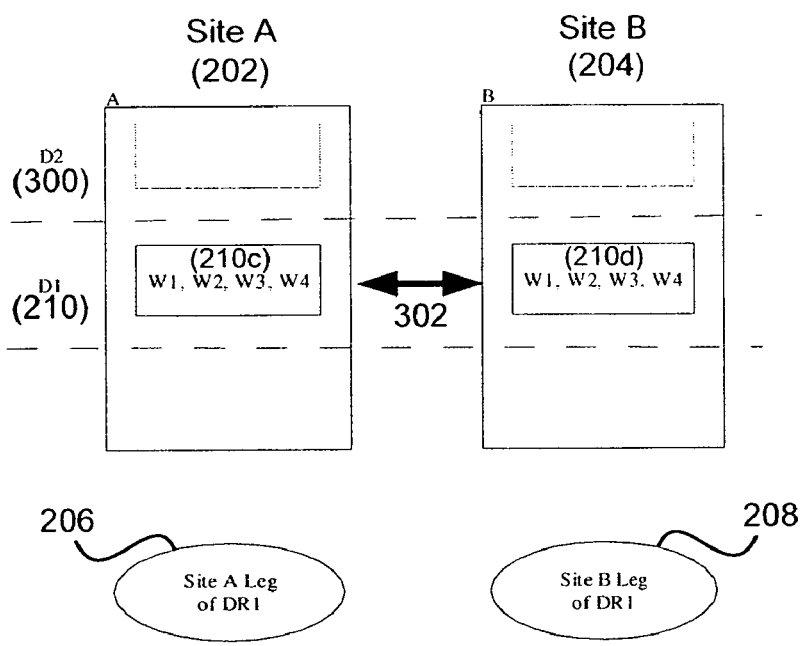
FIG. 3 illustrates a process step for use with multi-site storage system in accordance with one embodiment of the present invention.

The system in one aspect synchronizes the closing of the current delta across the sites so that the boundary of the delta respects dependent write ordering consistency. In other words, the edge of each delta can define a consistent view of storage. Once the current delta is closed, as shown in FIG. 3, a new delta D2 300 can be immediately opened to collect new writes from the application. The system then can exchange the partial deltas collected at each site across the inter-site link 302 so that sites A and B each have a complete copy of the closed delta (210c and 210d, respectively).

Figure 4:
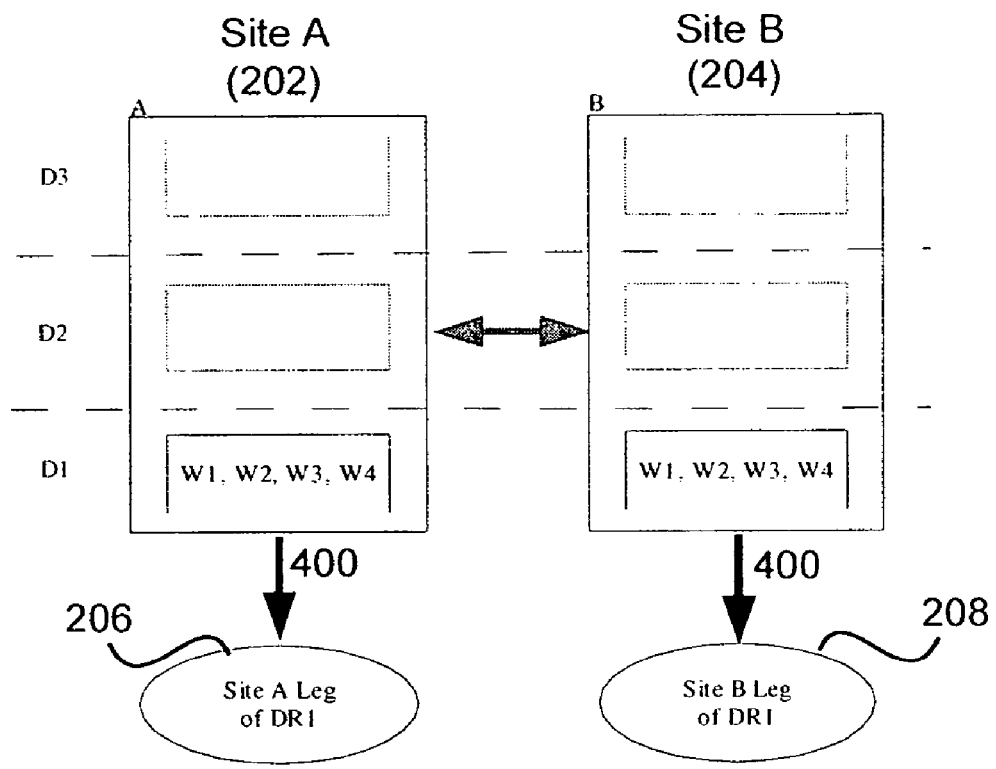
FIG. 4 illustrates a process step for use with multi-site storage system in accordance with one embodiment of the present invention.

The closed, complete deltas 210c, 210d can be applied via an appropriate link 400 to each leg 206, 208 of the DR1, as shown in FIG. 4. This apply process is not necessarily an atomic operation, meaning that the operation can be interrupted by various types of failure. Depending on the type of failure, it may be necessary to restart the process of applying the delta.

Figure 5:
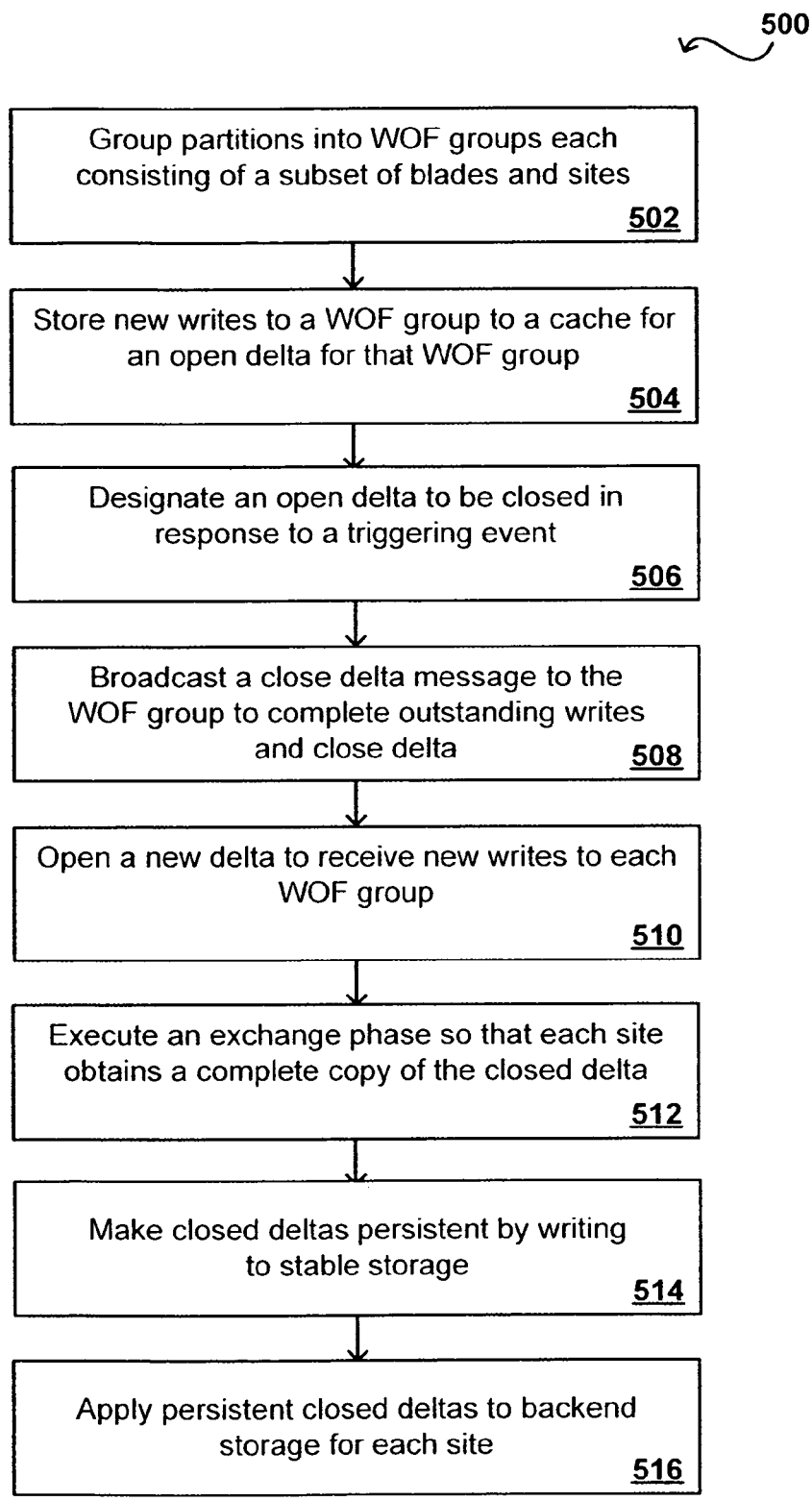
FIG. 5 illustrates steps of a method for storing data in accordance with one embodiment of the present invention.

FIG. 5 is a flowchart showing steps of an exemplary method 500 following such an approach. In this method, front-end volumes are grouped into WOF groups, each implemented by a subset of nodes and sites in the overall data system 502. New writes to any of the WOF groups are stored in a cache for an open delta for that WOF group 504. At some triggering event, the current open delta is to be closed 506. A close delta message is broadcast to the WOF group so that any outstanding writes can be completed and the delta can be closed 508. A new delta is then opened to receive new writes 510. The recently closed delta, which exists as unique fragments on different WOF groups, undergoes an exchange phase so that each site obtains a complete copy of the closed delta 512. The complete closed deltas are made persistent by writing to stable storage 514. After the closed deltas are persisted, the sites apply the closed deltas to backend storage for each site 516.

Figure 6:
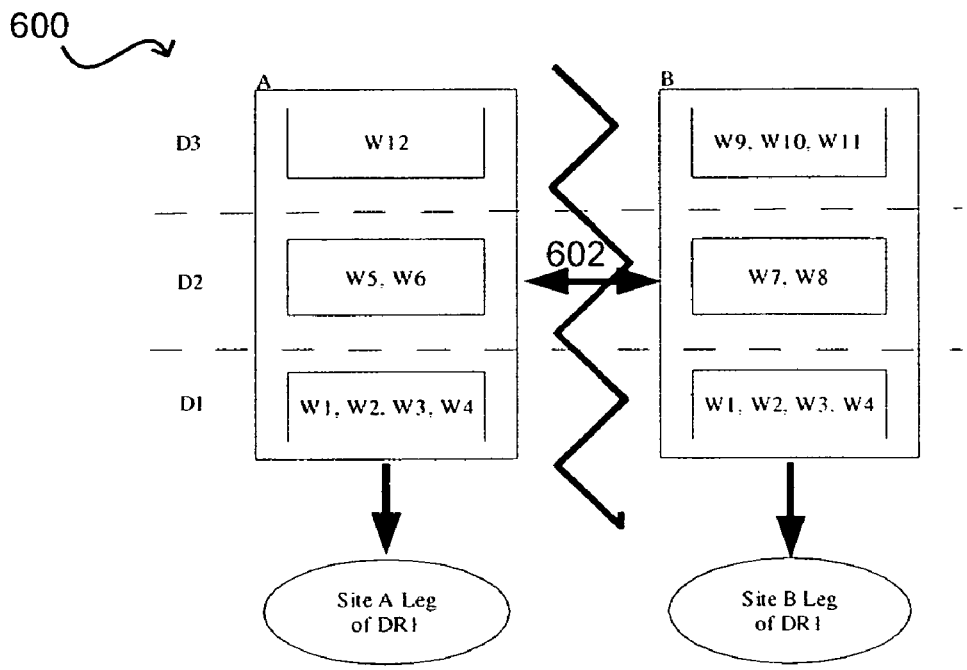
FIG. 6 illustrates a process step for use with multi-site storage system in accordance with one embodiment of the present invention.
Figure 7:
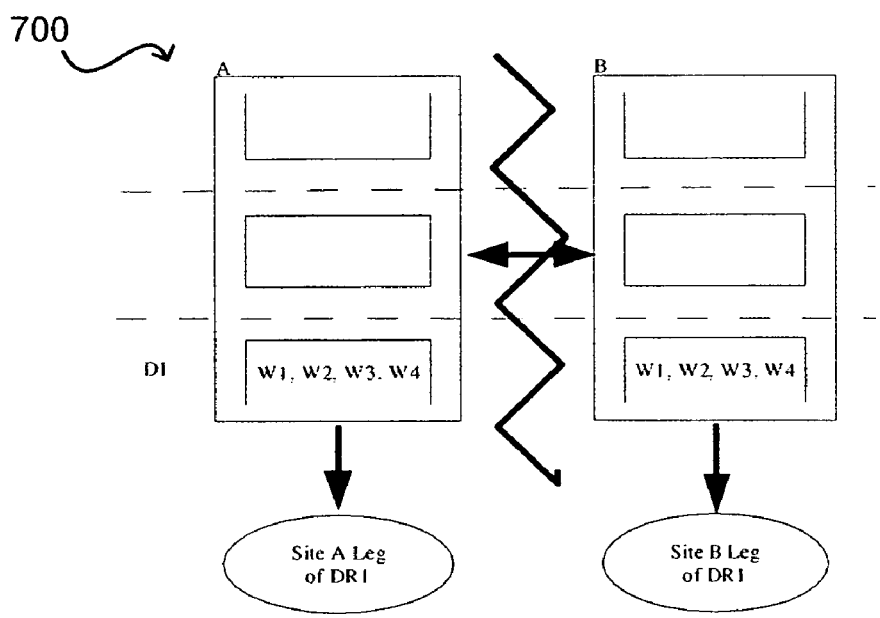
FIG. 7 illustrates a process step for use with multi-site storage system in accordance with one embodiment of the present invention.

The situation 600 of FIG. 6 shows the processes described above proceeding concurrently when a link failure happens. As writes are being collected for open delta D3, a closed delta D2 is being exchanged, and a committed delta D1 is being applied to disk, in this case to legs of the distributed RAID 1 system for each of sites A and B. If the link 602 for exchanging write data between the sites fails, front-end I/O will be suspended, so no more writes are collected into D3. Fragments of D2 cannot continue to be exchanged, and each site will continue to hold "dirty" data for that delta until the link heals or the administrator declares that one site must resume operation before the link heals. However, the committed delta D1 can continue being applied to the legs, as shown in the situation 700 of FIG. 7, as D1 no longer depends on the link being active. The legs of the DR1 will be identical after this completes, even if the link is down.

If the link failure is temporary, then normal operation resumes when the link heals. In the case where dirty data has been lost because site B holds the only copies of some writes that the system has acknowledged, sites A and B can discard the contents of deltas D2 and D3 and resume servicing application I/O. The contents of storage, as seen from site A, are consistent as of the last successfully exchanged and committed delta D1. While writing only to the local leg of the DR1, site A can update the bitmap logs so that the two legs of the DR1 can be synchronized when the link heals.

Performance Impact of WOF

A WOF implementation can be a substantial change to the flow of host writes from the front-end through to back-end physical storage. Several aspects of the implementation can affect the net performance of the system as perceived by the host.

For example, all nodes servicing a WOF group in one aspect must synchronize to close the current delta. This has obvious performance implications, especially for multi-site configurations. However, it should be noted that during this synchronization interval, reads will carry on normally, and incoming writes will receive data from the host, but will not be acknowledged until the delta closure is complete. Further, by collecting changes into a delta, these changes can be streamed across the inter-site link more efficiently than the smaller individual write operations.

Since applying a committed delta to storage is not an atomic operation, as discussed above, the operation is vulnerable to failures. A decision can be made as to the failures against which committed deltas not yet applied to storage are protected. This is equivalent to choosing how strong to make the consistency guarantee. There are several implementation options in this area, each with different performance tradeoffs.

Delta Collection Phase

In one aspect a first stage in the WOF pipeline is the collection of new writes into the open global delta. As a result of coherence protocols at the entrance to the cache, there are not two dirty copies of the same block. Therefore the intersection of partial deltas from different nodes or different sites is the empty set. The full global delta is the union of all the partial deltas.

As dirty blocks are added to an open delta, those blocks need to be linked to the open delta so that the blocks will move forward with the rest of the delta through the pipeline in a consistent write order. To accomplish this in accordance with one embodiment, two pieces of metadata can be added to the cache block data structure, used only for dirty data. A first piece of metadata is a delta identifier that stores the delta number to which this block belongs. This identification is immutable. The delta number is a system-wide global number that is incremented each time a new delta is opened when the pipeline advances. A second piece of metadata that can be added is a delta list that allows the cache block to be stored with its peers from the same delta. A singly linked list can be sufficient for this purpose.

Both metadata fields can be assigned as soon as a new write enters an open delta. Furthermore, when an incoming write is copied to another access node to protect against node failure, the delta id can be added to the metadata stored with the protection copy so that it can be recovered if the node that received the write fails.

When a new write arrives for a block that is already dirty in the cache somewhere in the system, one of at least two actions can be taken. If the dirty block is in the open delta, the dirty block can simply be invalidated. However, if the dirty block is in an older delta, invalidating the dirty block would violate dependent write consistency. In this case for at least one embodiment, the new write must be entered into the open delta, and must then shadow the old contents of the block for cache coherency purposes.

When a new write arrives for a block that is already dirty in cache somewhere in the system and that write modifies only a part of the block instead of overwriting it entirely, special treatment beyond that described above can be necessary. The data for the entire block being modified can be transferred to the node processing the write in such a way that the previous contents of the block cannot be lost due to node failure. One simple technique is for the node holding the current dirty contents of the block is to flush the block to storage before transmitting it to the node processing the new write, but this technique is not suitable for WOF because it violates dependent write consistency. Instead, the cache protection mechanisms described above can be extended, for example, as follows: (1) The old contents of the block are transferred to the node processing the write, which creates a protection copy as described above. (2) The original holder of the block invalidates its copy of the block and the corresponding protection copies. (3) The node processing the write applies the data from the application to the block, and updates its protection copy. However, this node must follow the constraints listed in the previous paragraph with respect to only deleting the old write and its protection copies if it is in the open delta. (4) Finally, the application write is acknowledged.

In one aspect, all write requests need to be sent with the requester's delta id in the DMG. This can be accomplished in a DMG/Cache API, such as by using the following example:

```
/* Add a deltaId argument to the dmg_writeRequest and
dmg_updateRequest
 * functions , and the registered calls into the cache for
   invalidate and
 * invalShare requests.
void
dmg_writeRequest(void *ctx, void *cookie, u64_t pageStart,
int pageCount,
            void **tickets, DataVector_t **dva, u8_t deltaId)
void
dmg_updateRequest (void *ctx, void *cookie, u64_t page, void
**tickets,
    DataVector_t **dva, u8-t deltaId);
void*
(dmgInvalRequest_t)(PartitionID-t lun, u64_t pageStart, int
pageCount,
       u8-t deltaId);
void*
(dmgInvalShareRequest-t)(PartitionID-t lun., u64_t page, void
**tickets,
        DataVector_t **dva, u8_t deltaId);
```

In one aspect, the requester could protect the dirty copy of the block as soon as it is received from the directory, and then begin the distributed completion of the write prior to accepting any new data from the host. This approach has the advantage that the DMG lock and the remote invalidation on the sharer are completed as soon as possible, thereby being less likely to hold up later distributed operations on the same page. A potential disadvantage of this approach is that it requires that the writer perform two protection operations prior to completing the write to the initiator—one before the host write transfer and one after. Alternatively, the requester could allow the write to continue and complete to the host prior to kicking off the distributed completion of the write. Such an approach avoids the double protection operation.

Collection During Closure Transition

When the open delta is closed, a new delta is opened to collect the next batch of new writes. Since the delta closure pipeline transition is not an instantaneous operation, there is a period of transition during which new writes are treated differently. Specifically, write data is accepted into the cache normally, but the acknowledgments of write completion to the host are delayed until the transition period is over.

Delta closure is the state transition that moves a delta in the WOF pipeline from the open state to the exchanging state. Events that can trigger a delta closure operation include a regular timer with a tunable interval, node memory constraints, an external trigger API and recovery from a system error condition. Any node is allowed to be the source of a closure trigger, although timer triggers should only come from a single designated node. Since multiple nodes can independently and asynchronously decide to trigger a delta closure, the closure barrier mechanism should be tolerant of redundant triggers. The triggering of a delta closure is described in more detail elsewhere herein.

Delta closure can be synchronized in one aspect with a distributed barrier mechanism such as a two-phase commit protocol. A barrier mechanism in accordance with one embodiment includes a number of stages. One such stage is a barrier enter stage in which a message is broadcast to all nodes in the WOF group. The message can be initiated on any node, which then becomes the leader for the rest of the barrier round. If there is a race condition and multiple nodes broadcast the barrier enter notification, the first one is the winner (using an ordered broadcast service such as virtual synchrony).

Another stage is a barrier acknowledge stage wherein a point-to-point message is sent by each member of the WOF group, when that member has reached the barrier, to the leader of the current round. A barrier acknowledge message can carry a data payload, so that information related to the barrier can be shared without unnecessary extra communication overhead.

Still another stage is a barrier exit stage wherein the round leader sends a broadcast message once the leader has gathered all the outstanding barrier acknowledge messages. A barrier exit message can contain the coalesced data from the barrier acknowledge messages, if any.

Barrier Use

In one aspect, a WOF implementation has a strict pipeline that advances in a lock-step manner, so there only is a single barrier to control the pipeline advancement for each WOF group. The barrier can be initiated on any node by the delta closure trigger, and that node becomes the barrier leader for the upcoming round by broadcasting a barrier entry message to all nodes. Once each node receives this broadcast, the node can increment the global delta id, so that all new write requests are pushed into the next delta. The node can hold off on acknowledging completion of new write requests to the host.

The node can wait until all ongoing write requests in the recently opened delta have completed, and can wait for the completion of the current exchange and commit stages, if necessary. The node then can notify the barrier leader that this node is ready to proceed by sending a message.

The exchange phase may be made more efficient by including information in the barrier acknowledge message, such as the partial delta size. However, since the barrier can affect the host application by holding up write completions, the duration can be minimized. Once the barrier leader has collected all the barrier acknowledge messages, it can broadcast an exit barrier message. As each affected node receives this notification, those nodes can acknowledge all the otherwise completed writes in the new open delta to the host, and allow future writes to complete normally. The nodes can kick off the exchange protocol for the previously open delta and start the commit protocol for the previously exchanged delta, as discussed later herein.

Exchange Phase

In one aspect, two things happen when a delta is in the exchange state. First, the partial deltas at each site are transferred to all of the other participating sites so that each site has a complete copy of the delta. Second, each site makes its respective copy persistent, or safe, before starting the commit to back-end storage.

The degree of safety can range from unprotected deltas vulnerable to any failure to a mirrored on-disk journal. A journal not only protects against node and site failures, but also means that data can be evicted safely from the cache. However, evicting a safely exchanged block from the cache incurs the performance penalty of reading it back from the journal during the commit phase. Due to this performance penalty, an implementation that keeps the entire commit delta in memory until it has been committed to storage is preferred in at least one embodiment. In such an implementation, the journal is write-only unless it is needed for failure recovery purposes.

One approach to addressing the question of degree of safety question is to take the middle ground with n-way protection. Problems with this approach, however, include the high memory consumption of the replication approach. Every site would need not only enough memory to store the partial open delta and two complete deltas in the exchanging and committing states, but also n replicated copies of everything. Further, in a system where sites have a mismatched number of nodes, the smaller sites have a smaller memory pool to use for the WOF pipeline, so larger sites will need to leave a portion of their WOF-usable memory unused. This issue arises in any in-memory solution, but is exacerbated by the extra memory usage the protection solution.

In one aspect, if the node receiving the write cannot allocate protection space for the block being written, a simple approach to processing the write is to force the written block through to disk immediately, that is, process this individual write in write-through. However, that approach violates dependent write ordering, and so protection space must be reserved in advance. After a node failure, one either has to acquire more protection space and re-protect the unsafe data, or remain in degraded mode while the pipeline is flushed. The protection approach provides no safety guarantee for single node sites, and loses data consistency after site failures or certain n-node failures. In the journaling approach, data consistency is never lost.

For these and other reasons, journaling is preferred for delta safety in at least some embodiments. Every node can use a small amount of protection space to keep its partial open delta safe from node failure. Once a block has been made safe in the journal at all sites during the exchange phase, the protection copy is no longer needed and can be invalidated and reused. Simple node failures are handled by re-protecting unsafe data, reading the safe delta from the journal, and restarting the exchange phase. More serious failures that lose all copies of a non-journaled block will necessarily be treated like a link failure, in that all sites will continue to atomically write out their commit delta, but the open and exchanging data will be discarded and the host application may need to be restarted. Failure handling is discussed in detail later herein.

Memory Provisioning

In one aspect, each node at each site with a leg of a distributed RAID 1 ("DR1") implementation, participating in a WOF group can have memory provisioned for an entire WOF pipeline. The cumulative site-wide memory usage for a WOF group as described herein has a total memory usage M and a memory W assigned to the WOF group.

$$M = R + W, \qquad (4.1)$$

where $$\begin{cases} R = \text{Protection space} \\ W = P + E + C, \text{ where} \end{cases}$$

$$\begin{cases} P = \text{oPen} \\ E = \text{Exchanging} \\ C = \text{Committing} \end{cases}$$

In one aspect, when creating the WOF group, the administrator specifies W, which applies to all participating sites. If the requested value for W cannot be allocated because other WOF groups have already consumed the available space, or for any other reason, the WOF group creation may fail, and other previously-created WOF groups will continue operations normally. Alternatively, the WOF group may be created with insufficient resources, but begin to reclaim resources from other uses. When enough resources have been acquired, the new WOF group can begin operation. The storage system may provide to the administrator the option to cancel WOF group creation if it is unable to collect sufficient resources after an extended period of time.

In an n-node site, M will be distributed evenly across the participating nodes, as each node, i, will be limited to $p_i = P/n$ for its partial open delta. Further, the exchange protocol will distribute E/n of the complete delta onto each node and the RMG will most likely put replicas on the neighbor nodes, meaning that approximately R/n will end up on each node.

From the value provided for W, the maximum size for P can be calculated, while accounting for the number of sites in the WOF group, s. The more sites there are, the greater the proportion of W will be used by fully exchanged deltas. If the same upper limit is used for P at every site, one can define the size of a fully exchanged delta as follows:

$$E = C = sP$$

$$W = P + (sP) + (sP) = P(1 + 2s)$$

and there before the maximum size for an open delta can be defined as follows:

$$P = \frac{W}{1+2s}$$

This value is the theoretical maximum for P. Replication target constraints can further limit the open delta. Each node at a site, i, is responsible for collecting $p_i$ of the open delta. That data can be replicated until it has been made safe on the journal. The site-wide replication requirements for a WOF group can be defined by the sum of the replication needs for each node at the site:

$$R = r_1 + r_2 + \ldots + r_i + \ldots + r_n$$

Each node will replicate not only the content of the currently open delta, but also the most recently closed delta until it has been made safe at the end of the exchange phase:

$$r_i = 2p_i$$

The replication space for a WOF group can be pre-allocated and readily available so that replication requests do not fail. However, the ideal allocation may not always be possible. Before I/O commences on a WOF partition, the RMG will be asked to reserve $r_i$, and if it cannot reserve all that has been requested, $p_i$ can be decreased accordingly. The modified values of $p_i$ then can be used as the space constraint for the delta closure trigger.

Memory Reservation

In one implementation, the memory for a WOF pipeline, including that for associated protection copies, is reserved in advance so that normal WOF operation does not have to handle temporary memory shortages. In alternate implementations, it would be possible to allocate memory to the WOF pipeline.

Exchange Protocol

An exchange protocol can ensure that all sites have local copies of the full exchanging delta. During the delta closure protocol, each node can construct a descriptor for the data in its partial delta and a second descriptor for the associated metadata, each of which will be sent in the barrier acknowledge to the round leader. The round leader will then distribute these descriptors in the barrier exit broadcast to all nodes participating in the WOF group. The nodes at each participating site then use these descriptors to fetch the delta fragments missing from that site. In one implementation, these descriptors are realized as keys for Remote Direct Memory Access (RDMA) regions.

Two tokens, one for exchanging and another for safety (e.g. journaling), can be circulated through the nodes at the site. One at a time, the nodes can acquire the exchange token and fetch data from other sites using the descriptors communicated earlier until the node exchange area is full. All nodes will have received the same descriptors in the barrier exit broadcast, and each node can simply start where the previous node left off and continue in-order through the regions. Since the node exchange area may become full after only partially transferring a remote region, the fetching node can ensure that it stops the transfer on a block boundary. As the data is received, the data can be split into blocks, which are assigned the appropriate delta id and attached to the correct delta list as described above.

After finishing its portion of the exchange, a node passes the exchange token on to its neighbor. The safety token follows the exchange token. Nodes may make their exchanged data (as well as their local partial delta) safe in chunks, as there is no need to wait until the entire node exchange area is full. The safety token may only be used for safety protocols that need to be serialized, like a disk journal. After making its portion of the exchange safe, a node passes the safety token on to its neighbor. When the last node releases the safety token, the exchange phase is done and the pipeline can be advanced. When the next barrier entry broadcast is received, the descriptors for the previous exchange round can be destroyed, and new descriptors created for the upcoming exchange.

Safety Protocol

In one aspect, a safety protocol is responsible for ensuring exchanged data is safe before the commit phase. If journaling is used to achieve this end, the administrator can provide local disk space for journaling when a WOF group is created. It is sensible to use mirrored disks to lower the likelihood of journal failure. Very little space is needed for the journal. For example, two fully exchanged deltas can be sufficient. Once a delta has been committed, the journaled version is no longer necessary.

The following diagram summarizes the format of the on-disk journal, J:

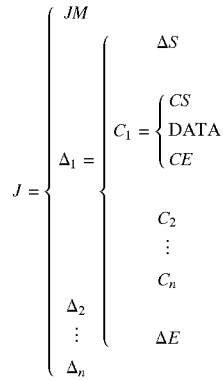

Each named element of the journal starts at a block boundary and occupies an integral number of blocks. The contents of exemplary named journal segments are as follows:

JM (Journal Metadata): identifies the associated WOF group, and the start of the current commit delta, as follows:

| | |
|---|---|
| wofGroupId | Metadata that describes the associated WOF group. |
| commit Delta Offset | The journal block offset at which the current commit delta starts. See Section 4.3.1 for more details on when this field is updated. |
| commitDeltaId | The delta-id of the current commit delta. |

$\Delta_i$ (Delta): encompasses all the data and metadata required to define a delta.

$\Delta S$ (Delta Start Metadata): the marker at the beginning of a journaled delta contains the following fields[1]:

| | |
|---|---|
| DS_MAGIC | A unique pattern identifying this disk block as a delta start marker. |
| deltaId | The delta_id of this delta. |
| deltaBlocks | The size of the data in this delta in blocks. |
| thisOffset | The block offset of this delta start marker. |
| timestamp | The time at which this delta start marker was generated. |
| partitionMappings | To save space in CM, this is a list of indices for the partitions in the WOF group. Each list |

-continued entry has the following format:
groupIndex    Contains the tuple (amfId,
              partition, blockSize).

$\Delta E$ (Delta End Metadata): the marker at the end of an on-disk delta contains the following fields:

| | |
|---|---|
| DE_MAGIC | A unique pattern identifying this disk block as a delta end marker. |
| deltaId | The delta_id of this delta. |
| deltaStartOffset | The offset of associated delta start marker. |
| thisOffset | The offset of this delta end marker. |

$C_i$ (Delta Chunk): represents a subset of data in the delta, and the metadata necessary to recover the chunk from the journal after a failure.

CS (Chunk Metadata Header): marks the beginning of a delta chunk, and contains the following fields:

| | |
|---|---|
| CS_MAGIC | A unique pattern identifying this as a chunk metadata header. |
| deltaId | The delta_id of this delta. |
| deltaStartOffset | The offset of the associated delta start marker. |
| endMarkerOffset | The offset of this chunk's metadata trailer. |

DATA (Chunk Data): the block data corresponding to this chunk, in the same order as the chunkBlocks metadata.

CE (Chunk Metadata Trailer): marks the end of a delta chunk, and contains the following fields:

| | |
|---|---|
| CE_MAGIC | A unique pattern identifying this as a chunk metadata trailer. |
| deltaId | The delta_id of this delta. |
| deltaStartOffset | The offset of the associated delta start marker. |
| startMarkerOffset | The offset of this chunk's metadata header. |
| chunkBlocks | An ordered list of blocks contained in the DATA portion of this chunk. Each list entry has the following format: <br> blockMetadata    Contains the tuple (groupIndex, blockNumber). |

Journal Advance

The journal can be written during the exchange phase. When the WOF pipeline advances, the journal performs a delta changeover as well. As each node receives the barrier exit broadcast, it can update the commitDeltaOffset and commitDeltaId fields in JM to point to the most recently journaled delta, as a persistent indication of global pipeline advancement. All sites write this indication at the same time, so all nodes at each site perform the write as they exit the barrier. With such a requirement, the write can only be interrupted by a complete site failure. In that case, all surviving sites should protect the writes in their current commit deltas by using the bitmap log.

Since the purpose of the exchange phase is to create duplicate copies of partial deltas, a simple failure handling mechanism involves simply restarting the exchange phase. If a delta has been made safe, but is not fully committed, the data can be read back into memory from the journal.

A failure of the journal disk should be rare, since it is supposed to be mirrored. If the journal disk does fail, a temporary degraded mode occurs. The WOF guarantee is lost only if a node or site failure happens before the situation is corrected. Degraded mode can be exited in at least two ways. First, if the administrator can rectify the problem that caused the disk failure, journaling can resume. Alternatively, the WOF pipeline is gradually flushed by decreasing the maximum size for the open delta, then switching into write-through (or write-back, depending on the administrator's preference) until the journal disk is healthy.

Flow Control

While a network connecting sites clearly should provide enough bandwidth to accommodate the average write throughput rate, a system in accordance with one embodiment is extended to tolerate bursts of I/O traffic. At least two strategies can be used, either independently or together.

In a first exemplary strategy, the system can maintain a queue of closed but not yet exchanged, or "pre-exchange," deltas. Should either the exchange of blocks during the exchange phase not complete before the next barrier triggering a pipeline advance or should the memory allocated for the delta collection phase prove inadequate causing a pipeline advance, then a new open delta can be opened to accept new writes. The recently closed delta can be held in a First-In First-Out (FIFO) queue of "pre-exchange delta sets". As an exchange phase completes, the next oldest pre-exchange delta can be advanced into the exchange phase. Thus, the system can provide a buffer for short-term bursts of write traffic that overrun the capacity of the network.

This concept can be extended in one aspect by combining two or more pre-exchange delta sets, should the queue of pre-exchange deltas become long. Combining pre-exchange deltas in this embodiment is done in the same way on all nodes in the system so that the resulting larger delta set represents a time range of writes that is consistent across the system. When combining two or more deltas, the union of all written blocks can be used. If an individual block has been written to more than once at a given node, resulting in incarnations in more than one delta set, then the most recent incarnation (block image in youngest pre-exchange delta set) can be used. Combining delta sets has an advantage of reducing the number of times a commonly written block is transmitted, creating a larger stream of transfer during the exchange phase resulting in potentially higher network efficiency, and amortizing cost of barrier operations over a larger time interval and data volume. A potential disadvantage is that there is a coordination cost of triggering and managing the combining of pre-exchange delta sets, and this extension can slightly increase the amount of data that would potentially be lost should a node be lost if operation had to be restarted from an earlier "post-exchange" delta image. Therefore, it can advantageously be used as a recovery mechanism when the system falls behind with a long queue of pre-exchange delta sets.

In a second exemplary strategy, the rate at which write data is accepted from the host into the WOF group is reduced, or "throttled." In this method, delays are inserted before acknowledging writes back to the host. The delays are increased or decreased to reflect the amount the system falls behind in exchanging delta sets. Slowing down individual writes will have the tendency of averaging out the write performance to bring the delivered performance back in line with the current network capacity.

Using both methods can provide a solution in accordance with one embodiment that can tolerate short term bursts without loss of system performance, while allowing a mechanism for a sustained overrun of writes without causing applications with short write time-outs to fail.

Another solution essentially treats the boxes as a DR1 through every stage of the dependent WOF protocol except the commit. At the commit phase, the nodes do nothing, but rather than allowing the data to be evicted, the data is kept around until the data is replicated to the passive site. Then if there is a site disaster at the active site, the host's view of storage at the passive site, as seen through the front-end of the nodes, will be consistent. At that point, the stored deltas can be written to the back-end storage. One potential disadvantage of this approach is that dirty data can be transferred twice over the inter-site links: once to exchange the partial deltas, and once when the active SRDF site pushes a batch to the passive site.

WOF Sub-components

A WOF component in one aspect consists of a number of separate subcomponents. One such subcomponent is referred to herein as a "wofserver." While a simple version of the wofserver can be used, the wofserver also can be responsible for group changes and failure handling, or can simply provide an NMG broadcast mechanism. Messages sent through this service can be processed on all nodes, where the "wofclient" code can determine group membership on the fly and act accordingly. The wofclient can provide a way for the local cache to register an AMF partition and get a WOF group handle. An API such as the following will suffice:

```
/* Registers the given AMF partition and closure trigger callback
   with the WOF
   * component, allowing it to provide an abstract handle to
   the group.
   */
WofGroup_t*
wof_registerPartition(AmfPartition_t *part, WofTriggerClosure_t
   *triggerCb);
```

Another sub-component is a separate, generic barrier mechanism using both COM and the NMG, as discussed later herein. This barrier is used only within the WOF component. Still another sub-component is a Delta Id Generator. A global delta id generator can support rollover and delta age comparisons. It can exports an API such as the following to the Cache:

```
/* Generates and returns the next delta id for the given WOF group.
 *
u8_t
wof_advanceDeltaId (WofGroup_t *wg) ;
/* Returns the current open delta id for the given WOF group.
u8_t
wof_deltaId(WofGroup_t *wg);
/* Compares the two delta ids, returning TRUE iff the second is newer.
 *bool_t
wof_isDeltaIdNewer (u8_t baseId, u8_t testId) ;
```

In order to keep the trigger mechanism separate from the Cache, the WOF component can be responsible for all trigger decisions, dependent on a periodic timer, memory constraints, or a user command (WOF trigger). The memory constraints in the first milestone can be arbitrarily selected, since no space needs to be reserved for exchanged partial deltas in a single site. This means that an API such as the following can be used:

```
/* When a new write enters the cache, it calls this function
   to let the WOF
   * know how much memory is about to be consumed in the
   open delta.
   */
void
wof_addToOpenDelta(WofGroup_t *wg, u32_t writeBlocklets);
/* When a write (local or remote) overwrites a block in this
   cache's open delta,
   * it calls this function to let the VOF know how much
   space has effectively
   * been freed up.
   */
void
wof_subtractFromOpenDelta(WofGroup_t *wg, u32_t
   overlapBlocklets);
/* When the trigger mechanism determines that it is time to
   close the currently
   * open delta, it calls this function to notify the cache.
   This can happen
   * within the context of a wof_addToOpenDelta call.
   The cache is responsible
   * for calling the triggerponeCb once it is ready for
   the closure to continue
   * (i e. all ongoing writes have finished). The
   triggerDoneCb can be called
   * within the context of the call to WofTriggerClosure_t.
   WOF will call this
   * function on each node at a site, and wait for all responses
   to arrive
   * before proceeding with the closure.
   */
typedef void
(WofTriggerClosure_t)(WofGroup_t *wg, void
   (*triggerDoneCb)(WofGroup_t *wg));
/* The cache calls this function on each node at a site to
   notify the WOF
   * when it has completed writing the current commit delta to
   disk. WOF must
   * wait for this call on all nodes before proceeding with
   the closure.
   */
void
wof_doneCommit(WofGroup_t *wg, u32_t commitDeltaId);
```

The last function is used in the strict pipeline so the WOF can wait until the appropriate moment to step through the closure barrier. In later milestones where there is an exchange protocol, a similar function call can be used to notify upon the completion of exchanges.

AMF Abstraction

An abstraction layer can be used above the AMF for delta writes. This can allow the WOF to differentiate between local AMFs and DR1s, and can handle bitmap logging as necessary. An API addition such as the following can be used, to be called in the place of amf_write by the cache:

```
/* To commit deltas to disk, the cache calls this function to
   let the WOF
   * deal with the underlying AMF.
   */
AmfErrors_t
wof_write (WofGroup_t *wg, u64_t blockNum, u32_t blockCount,
void *param,
   void **tickets, DataVector_t **dv, AmfIoCallback_t
   *callback);
```

Extensions to the Delta Set Concept

The following sections extend technology such as is disclosed in the following patent and patent applications on clustered controllers, geographic storage, cache coherency, and virtualization, which are hereby incorporated herein by reference in their entirety: U.S. Pat Nos. 6,912,668; 6,857,059; 5,875,456; 60/586,364; US-2003-0188655-A1; US-2001-0049740-A1; and US 2005-0071545 A1.

Active Passive Support

As discussed above, a dependent WOF implementation allows active access to data at one or more sites, whereby any site can actively read or write data that is asynchronously distributed between sites. One approach to extending the delta set concept recognizes that for any given volume at any given point in time, there may actually only be one node actively writing to a given WOF group out of many possible writers. Multiple nodes reading, one node writing during a period of time is an equivalent case. If this situation can be detected dynamically, the storage system can be optimized to lower the cost for the broadcast of deltas and to minimize the amount of data lost due to a system restart at an earlier delta.

Figure 8:
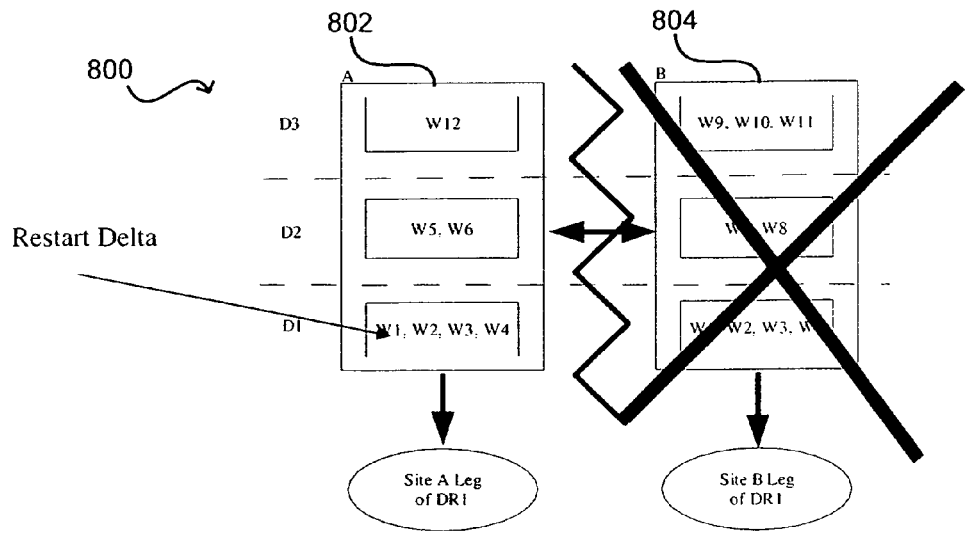
FIG. 8 illustrates a process step for use with multi-site storage system in accordance with one embodiment of the present invention.

If only one site is writing (momentary primary site), then the WOF solution can behave like traditional WOF solutions. In one example, the momentary primary site A 802 can survive then site B 804 fails in the situation 800 of FIG. 8. Site A can continue to process data without interruption or data loss. A major improvement over traditional WOF solutions is that other sites can continue to read the active data with assurance of data coherence. This concept incorporates and extends the notion of coherence between nodes, both within a site and across geography.

Another advantage is that the definition of which site is primary can be very dynamic. A site can be a momentary primary site if it is the only site that has written to any unsynchronized delta sets (open or closed). The implementation of this can require sites to broadcast that their partial delta set is dirty on the occurrence of their first write to the new delta set. The write making the partial delta set dirty can be held until all sites have acknowledged the notice. Thus, a surviving site will know how many delta set levels must be backed down, if any, to ensure data consistency. If none, then processing can continue without application restart or data loss. Even if the surviving site cannot be declared as a momentary primary site, data loss can be minimized by backing down only to the last delta set for which the site could be considered the momentary primary site.

Participating Nodes without a Local Leg of a DR1

Embodiments above generally discuss participating notes at various sites where each site has a local leg of a DR1. The totally-active WOF concept does not actually require all nodes to have local back-end data storage (local legs of DR1's). This is particularly useful when satellite sites desire to access data in a read/write fashion without the cost of keeping a full copy of the data volume locally mirrored.

One embodiment allows such "satellite nodes" to participate in the WOF group. In this instance, the satellite nodes would create open deltas and manage incoming writes in exactly the same manner nodes in a site with a local DR1 leg. The satellite node would participate in the barrier operation in exactly manner as other nodes. However, during the exchange phase it is necessary for satellite sites to only half participate in that it is not necessary to copy changes from other participating nodes to a satellite. Similarly, it is not necessary for satellite nodes to participate in the commit phase.

Note that a given node can participate the satellite behaviour (without a DR1 leg) for some WOF groups managed by the node, and still maintain a DR1 for others.

Explicit Passive Sites

Another extension involves dynamically determining that a site is not writing then making that site a passive site until a first write is detected from that site. Upon a write from a set "passive" site, a message can be broadcast to all of the sites so those sites know that this formerly passive site is now an active participant. In one aspect, the system can wait until a few partitions pass, such as three to five delta rollovers, to determine that a site that has not written over that period should be determined a passive site until doing a subsequent write. A cost to such an approach involves the need for the broadcast when the site again becomes active, so it is desirable to only set a site as passive if it is likely to remain passive for at least a period of time.

Operationally, it may be useful to explicitly determine a site to be passive via a configuration or operator command. This can remove the requirement to be included in the first-write broadcast. Aside from operational benefits, this reduces the latency of the first write into a partition.

A hybrid scenario exists of sites explicitly declared as passive with, potentially, multiple sites that are not. Thus, the notification between non-explicitly-passive would be done to determine momentary primary sites as per the description in the previous section. Site could also be declared as 'explicitly active' which an equivalent effect.

Partial Delta Set Synchronization After a Failure

One implication of maintaining the 'dirty delta set' bits described above is that it can quickly determined whether synchronizing partial delta sets (i.e. unsynchronized delta sets) would minimize data loss and possibly establish momentary primary site status.

Figure 9:
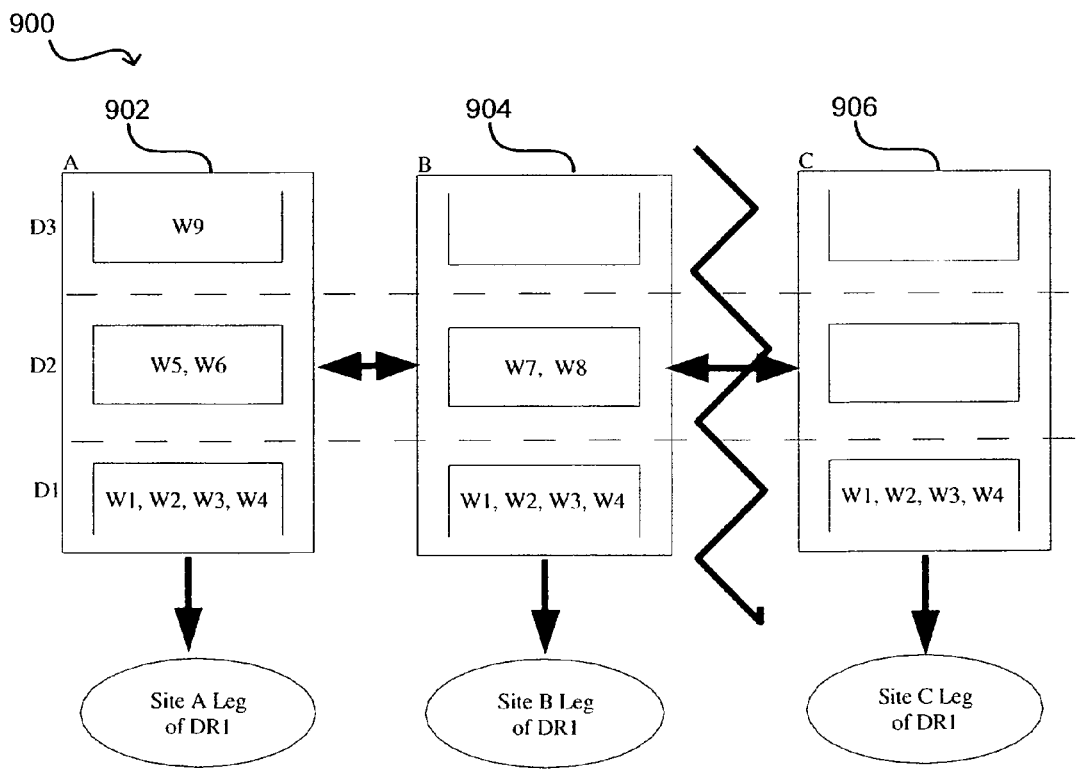
FIG. 9 illustrates a process step for use with multi-site storage system in accordance with one embodiment of the present invention.

As shown in the situation 900 of FIG. 9, the loss of site C 906 does not imply either loss of data or application backup, as synchronizing deltas D2 and D3 between sites A 902 and B 904 allows both A & B to be momentary primary sites. If a passive writer fails, there is no need to lose any data and the system can simply continue.

Synchronous Delta Sets

WOF as described herein can handle asynchronous data transfer as well as synchronous data transfer. WOF also can handle a combination of synchronous and asynchronous data transfer. For example, if the transfer distance to a data center is about 100 km, the speed-of-light latency is not that great. Since it is desired to have two protected copies of a data image at any given time, when the system writes to a host the write can be immediately inserted into a synchronous delta set. If there are two sites that are synchronously participating, and a third site halfway across the continent that is asynchronously participating, a write can be done from a host, and the blocks are immediately inserted not only into the local delta set but also into the synchronous partner. The system then returns and acknowledges the write, which is an indication of the safety of the data that was written. If replicating data by virtue of a synchronous delta 100 km away, upon completing the contract and acknowledging the write, the system is indicating that the data not only exists on the local site, in a cache form, but also exists in a cache form 100 km away. The asynchronous image going across the country will happen at some later time. From that perspective, if all data storage on the west coast is lost, for example, the data is vulnerable, but if only one area is lost, then the copy in another area is safe. Every write is synchronously mirrored between those two sites, so one site can be lost but the other site having a copy of the data still can be used to asynchronously push the data across the country.

In some cases, it would be convenient to declare groupings of synchronous delta sets whereby a write to any open partial delta set is synchronously written to other partial delta sets that resides within a common delta set synchronization group. In one aspect, write replication can be implemented in a way that is consistent with the delta set concept. For the purpose of this discussion, write replication refers to placing write dirty data in two or more independent pools of cache memory before returning 'write complete' to a host in order to protect that data from loss due to the failure of any given node. In another aspect, delta set synchronization groups implemented across geographic groupings can become a convenient method for increasing site failure tolerance. For example, two sites in relative close proximity could be declared as members of a synchronous delta set group while others in another geographic region would have their own grouping. This way any one site could be lost without data loss or operation interruption. At the same time, the effect of latency between regions is minimized.

Figure 10:
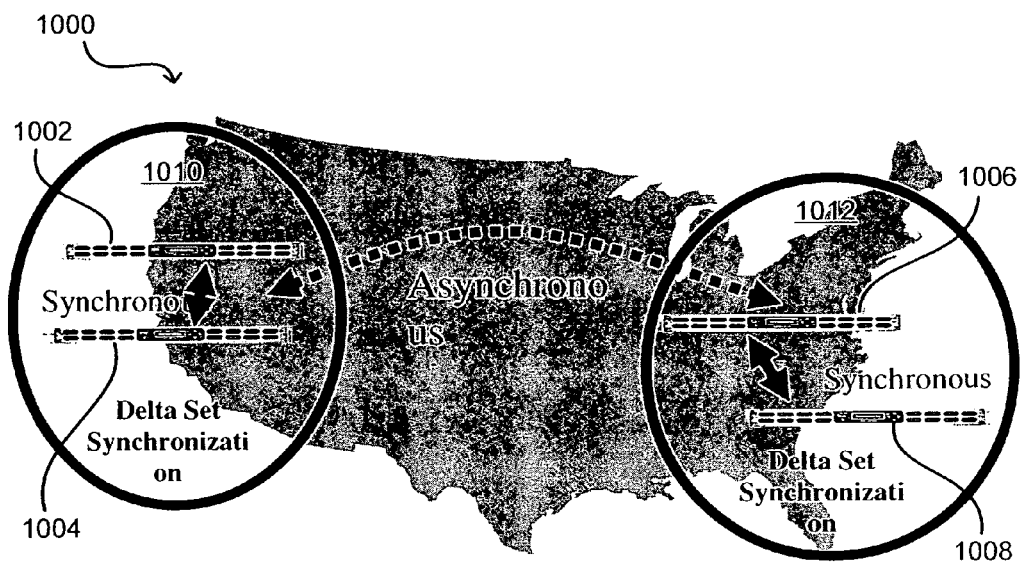
FIG. 10 illustrates a geographically separated, distributed storage system that can be used in accordance with one embodiment of the present invention.

In the diagram 1000 of FIG. 10, two sites 1002, 1004 on the west coast are declared as members of a first delta set synchronization group 1010. Similarly, two sites 1006, 1008 on the east coast are declared to be part of a second delta set synchronization group 1012. Writes into any given partial delta set are synchronously replicated (i.e. replication completes before write returns as complete) with other partial delta sets within the delta set synchronization group. Data is distributed across continent using the normal post-closing delta set data push operations. That this could also benefit from the persistent views of delta sets described below. Like other delta set behavior, Delta Set Synchronization Groups can be defined on a virtual volume by virtual volume basis.

Cascading Synchronous Delta Set Replication

Because a delta set receiving a write 'pushes' the data out to other delta sets the relationship does not have to be symmetric. For example, box 'A' could be required to synchronously replicate to box 'B', but 'B' could have no requirement to replicate to 'A' other than through the exchanges of partial delta information as part of the normal post-close operation.

This also allows for cascaded operations. For example: A writes into partial delta 'A' causes a synchronous write into 'B' and 'C' which causes a synchronous write from 'B' to 'D' and 'E' and from 'C' to 'F' and 'G'. An example of where this is useful is fanning out writes first between multiple nodes within a site and then across multiple sites.

Making Closed Delta Sets Cache Safe

As discussed above, completing a contract for a write is an indication that the data can operationally considered to be safe: In traditional single site storage systems, administrators make conscious choices that balance performance with data safety. In particular, they choose between write-through, write-back, and cache replicated write back. Cache replicated write-back can be extended with the potential for n-way replication of writes for additional protection.

The delta set structure allows for a similar level of operational flexibility in trading off when a delta set is safe. A lineage might include that the notion of a delta set is considered "safe" when any of the following are met:
  all dirty data has been written to all disk resident mirror images
  dirty data is written to the local disk and to cache at a remote site
  dirty data is replicated between partial delta sets on n caches at the local site and m caches at each of p sites.
  dirty data is replicated to n caches at the local site.
  the delta set is considered safe as soon as it is closed.

In the above the concept of replicating to n caches means exchanging between partial delta sets located on each of n caches. There is no requirement that the delta set be host exported on all of these nodes. Some instantiations of partial delta sets can be used purely to protect dirty data from a node failure.

Integrating Snapshots and Delta Sets

As discussed elsewhere herein, a snapshot refers to a logical point-in-time image of a live data set. A snapshot can be used for such functions as maintaining backup windows. When doing backups, for example, it is undesirable to shut down the storage system for an extended period of time to backup the data. What is desired is a point in time image of all the data so the data is consistent all the way across the backup tape.

A snapshot is desired to be time consistent, so the snapshot should reflect a point in time. Further, in some applications such as databases that point in time should correspond to a point that is application-safe. For example, a database can do commits after a series of reads and writes to flush out and commit the data to the database. In this case the snapshot can correspond to a commit point. A commit can be done when an acknowledgement comes back from the storage system that the last of the writes has been done for that commit point. Agents or other triggering events can be used to trigger a snapshot as known in the art. A snapshot today is typically implemented at the storage system layer.

These snapshots can advantageously be combined with delta sets. Even though storage is distributed across geography, a point in time image for the data still needs to be WOF consistent. In one aspect, a snapshot can be triggered by an agent or a timer, for example, which corresponds to a point in time. As soon as the snapshot is received, a rollover of the delta set can be triggered so that there is a domain-wide point-in-time image that corresponds to the point of the desired snapshot. The system can start with new I/O's, allowing that delta set to get all the way through the commit point. When the commit point is reached, and the write has been done to that open delta, the delta goes through the delta set pipeline. When all the writes have completed, the system can trigger the snapshot image ourselves. In one aspect, a snapshot can be triggered to an underlying storage device, which actually does a physical snapshot based on what is on the disk. In another aspect, a delta set can be kept relative to that point in time.

Each completed Delta Set is a representation of a volume of data at a consistent point in time. Logical snapshots (a point-in-time logical image of a volume) can be implemented simply by providing indices into earlier delta sets and allowing exported volumes that are based on the consistent data image at the close of the delta set.

It is important to allow Snapshots to be triggered by external sources, such as applications. For this reason, an interface for closing of Delta Sets can be provided, such as is discussed below.

A snapshot can also be exported read/write. From a delta set perspective, this causes family trees of delta sets to be created, each depicting a lineage evolving from an ancestry of delta sets. From the perspective of a user, the result appears exactly like the lineage of traditional logical snapshots.

An image that starts as a logical snapshot but through background copying creates a physical (rather than logical) copy of the data can also be implanted. This can be done by first creating a logical snap shot as described above and then, in the background, 'cloning' the physical embodiment of the ancestor delta sets onto separate media.

Extending Delta Sets Onto the Disk Image

As discussed elsewhere herein, a system in one aspect can have three delta sets that are open at any given time, with each of the delta sets representing a different point in time. One delta set represents a point in time as the data is finally committed to the disk, one represents a point in time as the data is about to be committed to the disk, and one represents a point in time at the beginning of the exchange. There also can be a number of open deltas throughout the system. Instead of creating a single, large base image collapsing all these deltas, system can keep many open deltas and can have many views of the data at various points in time. In such a system, if it is desired to back up to an appropriate point in time, the system can simply back up to the appropriate delta by indicating the point in time t and the appropriate image.

In one aspect, an implementation can take advantage of a technology such as continuous data protection (CDP). Many delta seta can be created that each represent a point in time, such that reading any given delta and the deltas behind that delta in time can present a picture of the data as it was at that point in time, such that CDP can be implemented. Delta sets are associative in the sense that as delta sets get older, the need for a fine granularity of points in time diminishes. As such, the delta sets can be collapsed in an associative fashion, combining delta sets in a courser fashion over time to reduce the amount of overall storage being used.

The concept of snapshots can be extended into CDP, then delta sets can be used to begin merging the granularity of delta sets over time. To do this, the deltas can be retrieved from cache and written to disk. Delta sets therefore can be created that are stored in cache plus disk, basically extending delta set storage onto disk. In doing so, the system can implement both snapshots and a CDP type of functionality. Both Delta sets and partial delta sets can be housed on either random access memory or on disk (or, for that matter, any media).

Merging Delta Sets (Using the Associatively of Delta Sets)

If delta sets are considered as a series of point-in-time images of the data (snapshots), the lineage of delta sets is associative. Older delta sets can be combined without changing the view exported by younger delta sets.

This allows the creation of a lineage of point-in-time images that represent relatively fine increments of time in more recent points of time. As delta sets 'age', delta sets can be merged together to create courser increments in time and reduce the overheads associated with maintaining point-in-time images.

The process of "merging" delta sets would be apparent to one of ordinary skill in the art in light of the teachings and suggestions contained herein. It can be a "Union" operation except where a change to a given block exists in multiple delta sets, then the most recent change can be used.

Remote Importers

Sites that remotely import WOF storage but do not have a local DR1 leg can have special behavior. Like any full-fledged participating site, these sites contribute to s for the purpose of calculating P. In one aspect, both P and R are calculated normally, but since there is no local storage to which to write, E=C=0. Nodes at the importing site do not participate in the exchange or commit phases beyond supplying their RDMA keys in the acknowledge barrier message during delta closure.

Integrating YottaDisks and Delta Sets

As referred to herein, and as disclosed in U.S. Pat. No. 6,857,059, issued Feb. 15, 2005, entitled "Storage virtualization system and methods," a Yotta Disk is a demand mapped virtual disk image of up to an arbitrarily large size (for example, $10^{24}$ bytes) that is presented to a host, e.g., the end-customer. In one embodiment, for example, the virtual disk image is used to produce a mapping from the virtual disk image to back-end physical storage which is done dynamically as a result of an I/O operation, e.g., write operation, performed on the physical storage. Remapping the storage allows the back-end storage to be managed without consumer impact and multiple back-end partitions to be combined to provide a single virtual image. The disk image presents potentially a very large image to the consumer to isolate the consumer from volume resizing issues and to allow easy consumption. This image may be supported by a management system that provides the ability to control consumption and growth rates as well as maintain core system processes such as creating, deleting, and mounting other candidate disks.

Yotta disks can also be implemented with delta sets using similar mechanisms. Since storage can need to be allocated dynamically, a back-end storage allocator can be used for both processes, allowing Yotta disks and delta sets to be implemented at approximately the same time. Delta sets can use mechanisms described in U.S. Pat. No. 6,857,059, incorporated by reference above, for example, to represent a sparse disk image that is demand-mapped and freed based on block references. A difference is the lineage of time representations provided by delta sets.

Dynamically Closing Delta Sets

Several mechanisms can be provided to close delta sets and, thus, open a new delta set. Such mechanisms include, for example:

Timed intervals

Intervals based on the number of transactions

Intervals based on the number of changes (writes) in a delta set or partial delta Application triggers Operator induced triggers Triggers induced by other subsystems Triggers induced by error conditions Hybrids of the above.

In the case of timed intervals, the size of the interval can be adjusted to account for change conditions. For example, an overloaded network may be grounds for increasing the duration of a delta set in order to lower impact on the network. A period of 'heightened alert' may trigger much finer delta sets to lower the likelihood of data loss during periods of high data-dependency.

Given that any node could, potentially, trigger the turn-over of a delta set, these triggers do not have to be consistent across various nodes.

Time Firewalls

"Seneca: remote mirroring done write," by Minwen Ji et al, proceedings of USENIX Technical Conference, pages 253-256, June 2003, proposed a concept of Time Firewalls. One embodiment described herein extends on such a concept to include both time delayed read-only perspectives of a data volume as well as multi-writer, totally active geographically distributed access to the current data view. In other aspects, the various WOF optimizations are integrated with the concept.

One of the concerns of interconnecting multiple sites is that logical errors (as opposed to physical failures) can quickly propagate across sites. For example, a virus inserted at one site quickly infects all sites sharing the data image. The point-in-time/delta set concept described above can provide an efficient mechanism for providing "safe" windows into the evolution of data.

Sites operating in an active/passive manner can provide a read-only portal into the data that is based on point-in-time images (delta sets) that lag behind the active data. The read-only image can automatically advance in the delta sets maintaining to a pre-determined 'safe' interval. This way, normal processes can continue to run on 'live' data that would detect a logical failure or corruption of data. Should such an event be detected, the advancement of the 'safe' read only image can be suspended until the problem was rectified.

A 'remote' site (or any site) can have open both a current delta set image, which behaves like any other multi-writer delta set, and a 'safe' window into an earlier delta set open at the same time.

In a specific example, two entities might want to collaborate and share data freely, but want to avoid the situation where a virus is inserted in one data for one entity and then is spread to the other entity. Therefore, in this example it is preferred to not simply have a single, large data repository. A solution in accordance with one embodiment allows one of the entities to write only partitions, then export the data to the other agency such that each entity will have a different viewpoint into the data. One viewpoint is a synchronous image of the data, as if there were simply two normal WOF sites. At some time delay point, there is a second volume that is a period of time (such as half an hour) behind that is considered to be a safe view of that data. If something happens to one entity, the system can simply stop advancing the save pointer until the problem is rectified and the virus is taken out. There can be both a real time image of the data and an image that is at least a half hour time delayed. The delayed image can update itself with delta set closures, etc., to maintain itself roughly one half hour behind, and can continue to advance in time unless something or someone indicates that there is a problem and the updating should stop. The delayed image then can stay at the safe point until instructed to do otherwise.

Nested Delta Sets

If there are two sites that are relatively close compared to other sites, a finer grain transfer of data can be made between those close sites, such as for synchronous replication, etc. The delta sets can be nested so that the pair of close sites can make frequent exchanges, but at a "meta"-delta set closure. This meta-delta set exchange can be more granular than a typical delta-set exchange. Exchanging more often can provide for more frequent updates at a relatively low cost due to the proximity of the sites.

Figure 11:
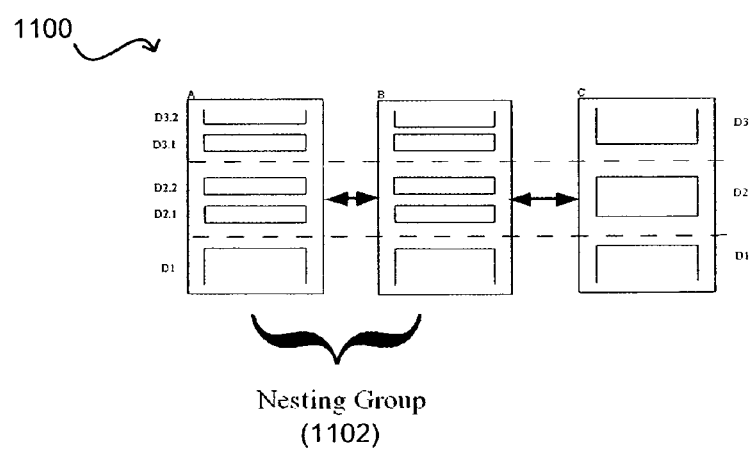
FIG. 11 illustrates a distributed storage system including a nesting group that can be used in accordance with one embodiment of the present invention.

Nesting the delta sets allows subsets of nodes to turn-over sub delta sets, so that nodes with close geography can synchronize with a finer grained delta set than would be used at larger distance. For example, the situation 1100 of FIG. 11 shows the grouping of two sites that are geographically close into a nesting group 1102. This can help to minimize the likelihood of data loss and maximize the opportunity for momentary primary sites after a failure.

RAID across Delta Sets

A Delta Set implementation can exchange elements of partial delta sets between all nodes after closing the delta sets, effectively mirroring the changes between all nodes. Making the changes "safe" by replicating them between nodes does not have to imply simple mirroring. For example, any RAID pattern of placing could be used. In this case the 'D' does not refer to disk images, but node instances, whether in cache or on disk.

The "Safe" placement should also be aware of physical realities. For example, multiple nodes within a site may need only one copy between them with mirrors, or other redundant copies being storied at other sites.

For example, if there are five sites doing delta set exchanges across geography, rather than doing RAID 1 mirrors between all five sites, a type of RAID 5 implementation can be done to put data in some subsets. this allows any site to be lost while still having access to the data. As known in the art, RAID 5 includes features such as data striping and parity checking, so no site may have a full set of the data. The exchange portion for the delta sets can be implemented as a RAID write. It is not necessary to send each block to every other host, but instead can route blocks based on RAID striping. At any given time the data might only be at two sites or three sites, or one site plus a checksum. This cuts down on the need for a full broadcast of all data.

Redefining Storage Primitives using Delta Sets.

The traditional layering of storage includes, in order: cache, cache replication, virtualization, traditional RAID. This can be replaced with a different layering that includes a coherence layer, a delta set layer, and then a physical resource allocator that indicates where everything is placed. Combining what is described above, it is possible to redefine storage archives in terms of primitives surrounding delta sets. So instead of a traditional layering of:

Cache
Cache replication
Virtualization
Traditional RAID these primates can present a new layering approach such as:

Coherence Layer
Delta Sets with properties and ancestry
A physical resource allocater that maps delta sets to physical devices.

Functionality of various embodiments can be implemented through any appropriate combination of hardware and software as known in the art. For example, software and logic can be stored in an information storage medium, contained internally or externally to the various components, accessories, and/or devices, as a plurality of instructions or program code. Storage media and computer readable media for containing the code, or portions thereof, can include any appropriate media known or used in the art, including various storage media and communication media, such as but not limited to volatile and non-volatile, removable and non-removable media implemented in any method or technology for storage and/or transmission of information such as computer readable instructions, data structures, program modules, or other data, including EEPROM, flash memory or other memory technology, CD-ROM, ROM, RAM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement aspects of the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of providing write order fidelity in a distributed set of data access nodes in a network, comprising the steps of:

storing a write request to a first cache for an open delta, the first cache corresponding to a first node receiving the write request;

transmitting a message, in response to a triggering event, to each node in the set of data access nodes to close the open delta;

for each node having a write request for the open delta, completing any pending write requests for the open delta and closing the open delta;

exchanging write request information among nodes so that each node is associated with a complete copy of the write request information for the closed delta;

writing each complete copy to persistent storage;

storing each complete copy of the closed delta to back-end storage for each node; and grouping front-end volumes into write-order fidelity (WOF) groups, each WOF group including at least one site across the network.

2. A method according to claim 1, wherein:

each site includes at least one of said nodes, wherein all nodes are operable to read and write concurrently.

3. A method according to claim 1, wherein:

storing writes for each WOF group in a cache for the open delta for that WOF group.

4. A method according to claim 1, further comprising:

executing the triggering event.

5. A method according to claim 1, further comprising:

opening a new delta to receive new writes upon closing the open delta.

6. A method according to claim 1, further comprising:

providing localized cached access to remote data for geographically separated nodes.

7. A method according to claim 1, wherein:

writing each complete copy to persistent storage includes writing a metadata update entry to a recovery log, when writing a data update to a database when the metadata update entry writing is completed.

8. A method according to claim 1, further comprising:

reordering write requests in the open delta before closing the open delta.

9. A method according to claim 1, further comprising:

generating the triggering event using a mechanism selected from the group consisting of: timed intervals, intervals based on the number of transactions, intervals based on the number of changes/writes in a delta set or partial delta, application triggers, operator induced triggers, triggers induced by other subsystems, triggers induced by error conditions, and combinations of the above.

10. A method according to claim 1, wherein:

the network is selected from the group consisting of a storage area network (SAN), a local area network (LAN), a wide are network (WAN), and a metropolitan area network (MAN).

11. A method according to claim 1, wherein:

transmitting a message includes broadcasting the message to each node in the set of data access nodes.

12. A method of providing write order fidelity in a distributed set of data access nodes in a network, comprising the steps of:

storing a write request to a first cache for an open delta, the first cache corresponding to a first node receiving the write request;

transmitting a message, in response to a triggering event, to each node in the set of data access nodes to close the open delta;

for each node having a write request for the open delta, completing any pending write requests for the open delta and closing the open delta;

exchanging write request information among nodes so that each node is associated with a complete copy of the write request information for the closed delta;

writing each complete copy to persistent storage;

storing each complete copy of the closed delta to back-end storage for each node; and triggering a data snapshot corresponding to the closing of the open delta.

13. A system for providing write order fidelity in a distributed set of data access nodes in a network, comprising:

a storage system for storing data; and a plurality of access nodes configured to access data in the storage system, wherein each node in the plurality of access nodes is operable to store a write request to a cache for an open delta, the cache corresponding to the node receiving the write request, each node being further operable to transmit a message, in response to a triggering event, to said plurality of access nodes in the data storage network to complete any write requests and close the open delta, each node being further operable to exchange write request information so that each node is associated with a complete copy of the write request information for the closed delta, each node being further operable to write each complete copy to persistent storage then apply each persistent copy of the closed delta to back-end storage for that node, and the storage system is further operable to create a snapshot of any open deltas at any point in time.

14. A system according to claim 13, wherein:

at least one of the nodes is geographically remote from the other nodes.

15. A system according to claim 13, wherein:

at least one of the access nodes is operable to mirror data to a remote location.

16. A system according to claim 13, further comprising:

a plurality of sites, each site including at least one of said nodes.

17. A system according to claim 13, wherein:

the storage system is further operable to determine when one of the sites is not writing data to the storage system, and operable to set that site as a passive site until that passive site needs to write.

18. A system according to claim 17, wherein:

the storage system is further operable to broadcast a message to the other sites indicating the status of the passive site.

19. A system according to claim 13, wherein:

the storage system is operable to execute asynchronous and synchronous data transfer.

20. A system according to claim 13, wherein:

each node is further operable to exchange write request information by exchanging write request information with a first subset of the plurality of access nodes, whereby the first subset of nodes exchanges the write request information with a second subset of the plurality of access nodes.

21. A system according to claim 13, wherein:

each node is operable to replicate writes to a plurality of caches.

22. A system according to claim 13, wherein:

the data storage system maintains three deltas, each delta representing one of a point in time that data is finally committed to the disk, a point in time that data is about to be committed to the disk, and a point in time at the beginning of the exchange.

23. A system according to claim 13, wherein:
the storage system is further operable to merge deltas over time.

24. A system according to claim 13, wherein:
the storage system is further operable to close delta seta using a mechanism selected from the group consisting of: timed intervals, intervals based on a number of transactions, intervals based on a number of writes in a delta set or partial delta, application triggers, operator induced triggers, triggers induced by other subsystems, triggers induced by error conditions, and combinations thereof.

25. A system according to claim 13, wherein:
the network is selected from the group consisting of a storage area network (SAN), a local area network (LAN), a wide are network (WAN), and a metropolitan area network (MAN).

26. A system according to claim 13, wherein:
each node is further operable to transmit a message to said plurality of access nodes by broadcasting the message to each node in the set of data access nodes.

27. A system for providing write order fidelity in a distributed set of data access nodes in a network, comprising:
a storage system for storing data;
a plurality of access nodes configured to access data in the storage system; and
a plurality of sites, each site including at least one of said nodes;
wherein each node in the plurality of access nodes is operable to store a write request to a cache for an open delta, the cache corresponding to the node receiving the write request, each node being further operable to transmit a message, in response to a triggering event, to said plurality of access nodes in the data storage network to complete any write requests and close the open delta, each node being further operable to exchange write request information so that each node is associated with a complete copy of the write request information for the closed delta, each node being further operable to write each complete copy to persistent storage then apply each persistent copy of the closed delta to back-end storage for that node; and
wherein the storage system is further operable to determine when only one site is writing data to the storage system, whereby exchanging write request information is suspended until multiple sites are writing to the storage system.

28. A computer program product embedded in a computer readable medium for providing write order fidelity in a distributed set of data access nodes in a network, comprising:
computer program code for storing a write request to a first cache for an open delta, the first cache corresponding to a first node receiving the write request;
computer program code for transmitting a message, in response to a triggering event, to each node in the set of data access nodes to close the open delta;
computer program code for completing any pending write requests for the open delta and closing the open delta for each node having a write request for the open delta;
computer program code for exchanging write request information among nodes so that each node is associated with a complete copy of the write request information for the closed delta;
computer program code for writing each complete copy to persistent storage;
computer program code for storing each complete copy of the closed delta to back-end storage for each node; and
computer program code for grouping front-end volumes into write-order fidelity (WOF) groups, each WOF group including at least one site across the network.

29. A computer program product according to claim 28, further comprising:
computer program code for storing writes for each WOF group in a cache for the open delta for that WOF group.

30. A computer program product according to claim 28, further comprising:
computer program code for providing localized cached access to remote data for geographically separated nodes.

31. A method of providing write order fidelity in a distributed set of data access nodes in a network, comprising the steps of:
providing a plurality of write-order fidelity (WOF) groups, each WOF group including at least one of said data access nodes;
storing a write request to a first cache corresponding to a first node in a first WOF group receiving the write request;
in response to a triggering event, exchanging write request information among the nodes in the first WOF group so that each node is associated with a complete copy of the write request information;
writing each complete copy to persistent storage;
storing each complete copy to back-end storage for each node; and
triggering a data snapshot corresponding to a state of the cached write request for the first WOF group.

32. A method according to claim 31, further comprising:
providing localized cached access to remote data for geographically separated nodes.

33. A method according to claim 31, wherein:
writing each complete copy to persistent storage includes writing a metadata update entry to a recovery log, when writing a data update to a database when the metadata update entry writing is completed.

34. A method of providing write order fidelity in a distributed set of data access nodes in a network, comprising the steps of:
providing a plurality of write-order fidelity (WOF) groups, each WOF group including at least one of said data access nodes;
storing a write request to a cache corresponding to one of the plurality of WOF groups, each WOF group associated with a cache and operable to receive write requests from a plurality of request writers having access to at least one node in the WOF group;
in response to a triggering event for a WOF group, exchanging write request information among the nodes in the WOF group so that each node is associated with a complete copy of the write request information;
storing each complete copy to persistent storage;
storing each complete copy to back-end storage for each node; and
triggering a data snapshot corresponding to a state of the cached write request for the WOF group.

35. A computer program product embedded in a computer readable medium for providing write order fidelity in a distributed set of data access nodes in a network, comprising:

computer program code for providing a plurality of write-order fidelity (WOF) groups, each WOF group including at least one of said data access nodes;

computer program code for storing a write request to a cache corresponding to one of the plurality of WOF groups, each WOF group associated with a cache and operable to receive write requests from a plurality of request writers each having access to at least one node in the WOF group;

computer program code for in response to a triggering event for a WOF group, exchanging write request information among the nodes in the WOF group so that each node is associated with a complete copy of the write request information;

computer program code for storing each complete copy to persistent storage;

computer program code for storing each complete copy to back-end storage for each node; and computer program code for triggering a data snapshot corresponding to a state of the cached write request for the WOF group.

\* \* \* \* \*